(12) United States Patent
Toriumi et al.

(10) Patent No.: US 12,519,424 B2
(45) Date of Patent: Jan. 6, 2026

(54) OSCILLATOR AND ELECTRONIC APPARATUS

(71) Applicant: SEIKO EPSON CORPORATION, Tokyo (JP)

(72) Inventors: Yuichi Toriumi, Minowa (JP); Hisahiro Ito, Minowa (JP)

(73) Assignee: SEIKO EPSON CORPORATION (JP)

( * ) Notice: Subject to any disclaimer, the term of this patent is extended or adjusted under 35 U.S.C. 154(b) by 33 days.

(21) Appl. No.: 18/588,503

(22) Filed: Feb. 27, 2024

(65) Prior Publication Data

US 2024/0291433 A1 Aug. 29, 2024

(30) Foreign Application Priority Data

Feb. 28, 2023 (JP) .................. 2023-029382

(51) Int. Cl.
*H03B 5/20* (2006.01)
*G06F 1/10* (2006.01)
*H03B 5/30* (2006.01)
*H05K 1/18* (2006.01)

(52) U.S. Cl.
CPC .......... *H03B 5/20* (2013.01); *G06F 1/10* (2013.01); *H03B 5/30* (2013.01); *H05K 1/181* (2013.01); *H05K 2201/10015* (2013.01); *H05K 2201/10075* (2013.01)

(58) Field of Classification Search
CPC ... H03B 5/20; H03B 5/30; H03B 5/04; H05K 1/181; G06F 1/10
See application file for complete search history.

(56) References Cited

U.S. PATENT DOCUMENTS

2023/0385221 A1* 11/2023 Gao .................. G06F 1/10

FOREIGN PATENT DOCUMENTS

JP 2019-004438 A 1/2019

* cited by examiner

*Primary Examiner* — Jeffrey M Shin
(74) *Attorney, Agent, or Firm* — Harness, Dickey & Pierce, P.L.C.

(57) ABSTRACT

An oscillator includes a power supply terminal, a ground terminal, a positive-side clock terminal, and a negative-side clock terminal. The power supply terminal is supplied with a high potential-side power supply voltage. The ground terminal is supplied with a low potential-side power supply voltage. The positive-side clock terminal outputs a positive-side clock signal of a differential clock signal. The negative-side clock terminal outputs a negative-side clock signal of the differential clock signal. The power supply terminal and the ground terminal are arranged side by side, and the positive-side clock terminal and the negative-side clock terminal are arranged side by side.

15 Claims, 14 Drawing Sheets

OSCILLATOR AND ELECTRONIC APPARATUS

The present application is based on, and claims priority from JP Application Serial Number 2023-029382, filed Feb. 28, 2023, the disclosure of which is hereby incorporated by reference herein in its entirety.

BACKGROUND

1. Technical Field

The present disclosure relates to an oscillator, an electronic apparatus, and so on.

2. Related Art

In JP-A-2019-004438 (Document 1), there is disclosed an oscillator for outputting a differential oscillation signal. As represented by the oscillator disclosed in Document 1, a layout method of placing a power supply terminal and a ground terminal at diagonal positions of a package is common in a six-terminal oscillator.

When the power supply terminal and the ground terminal are arranged at the diagonal positions in the package in the oscillator as in Document 1, connecting wiring including a through hole is formed on a mounting board in many cases. Further, when coupling a decoupling capacitor between the power supply terminal and the ground terminal, there is a problem that an effect of the decoupling capacitor is impaired in consequence of a parasitic inductance of the through hole.

SUMMARY

An aspect of the present disclosure relates to an oscillator including a power supply terminal supplied with a high potential-side power supply voltage, a ground terminal supplied with a low potential-side power supply voltage, a positive-side clock terminal configured to output a positive-side clock signal of a differential clock signal, and a negative-side clock terminal configured to output a negative-side clock signal of the differential clock signal, wherein the power supply terminal and the ground terminal are arranged side by side, and the positive-side clock terminal and the negative-side clock terminal are arranged side by side.

Further, another aspect of the present disclosure relates to an electronic apparatus including the oscillator described above, and a circuit board on which the oscillator is mounted.

DESCRIPTION OF EMBODIMENTS

The present embodiment will hereinafter be described. It should be noted that the present embodiment hereinafter described does not unreasonably limit a content set forth in the appended claims. Further, all of the elementals described in the present embodiment are not necessarily essential elements.

1. Oscillator

Figure 1:
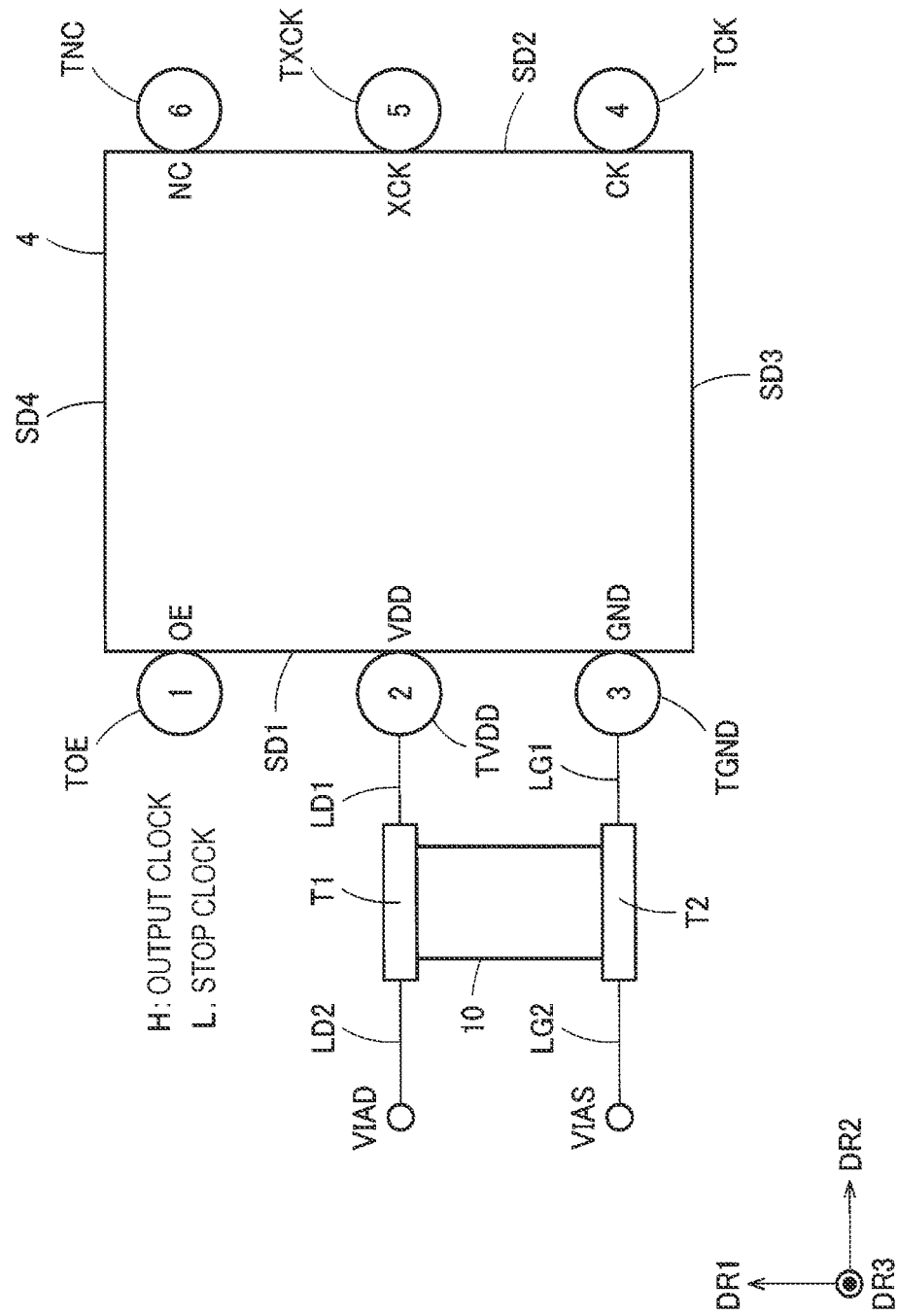
FIG. 1 is a diagram showing a first configuration example of an oscillator according to the embodiment.

FIG. 1 shows a first configuration example of an oscillator 4 according to the present embodiment. FIG. 1 is an appearance diagram of the oscillator 4 viewed with a plan view in a direction perpendicular to a principal surface of the oscillator 4. The oscillator 4 according to the present embodiment includes an output control terminal TOE, a power supply terminal TVDD, a ground terminal TGND, a terminal TNC, a positive-side clock terminal TCK, and a negative-side clock terminal TXCK. The terminal TNC is an NC (Non Connection) terminal. The principal surface of the oscillator 4 is, for example, a surface on which these terminals are disposed.

Further, in the present embodiment, as shown in FIG. 1, the output control terminal TOE, the power supply terminal TVDD, the ground terminal TGND, the positive-side clock terminal TCK, the negative-side clock terminal TXCK, and the terminal TNC are assigned to, for example, a first terminal, a second terminal, a third terminal, a fourth terminal, a fifth terminal, and a sixth terminal of the oscillator 4, respectively.

Further, as shown in FIG. 1, an upper side with respect to the principal surface of the oscillator 4 is defined as a third direction DR3. The upper side means a direction toward an obverse surface from a reverse surface in the thickness direction of the oscillator 4. An opposite direction to the third direction DR3, namely a lower side with respect to the principal surface of the oscillator 4, is defined as a fourth direction DR4. In other words, the third direction DR3 and the fourth direction DR4 are set as directions perpendicular to the principal surface of the oscillator 4. Further, directions parallel to the principal surface of the oscillator 4, and perpendicular to each other are defined as a first direction DR1 and a second direction DR2. The plan view means viewing the oscillator 4 from the third direction DR3.

The oscillator 4 according to the present embodiment has a rectangular shape having, for example, a first side SD1, a second side SD2, a third side SD3, and a fourth side SD4 as the sides thereof in the plan view. The first side SD1 and the second side SD2 are each a side parallel to the first direction DR1, and are each a long side of the rectangular shape. Further, the third side SD3 and the fourth side SD4 are each a side parallel to the second direction DR2, and are each a short side of the rectangular shape. Further, in the oscillator 4 shown in, for example, FIG. 1, the output control terminal TOE, the power supply terminal TVDD, and the ground terminal TGND as the first terminal, the second terminal, and the third terminal are disposed along the first side SD1. Further, the terminal TNC, the negative-side clock terminal TXCK, the positive-side clock terminal TCK are disposed along the second side SD2.

Figure 6:
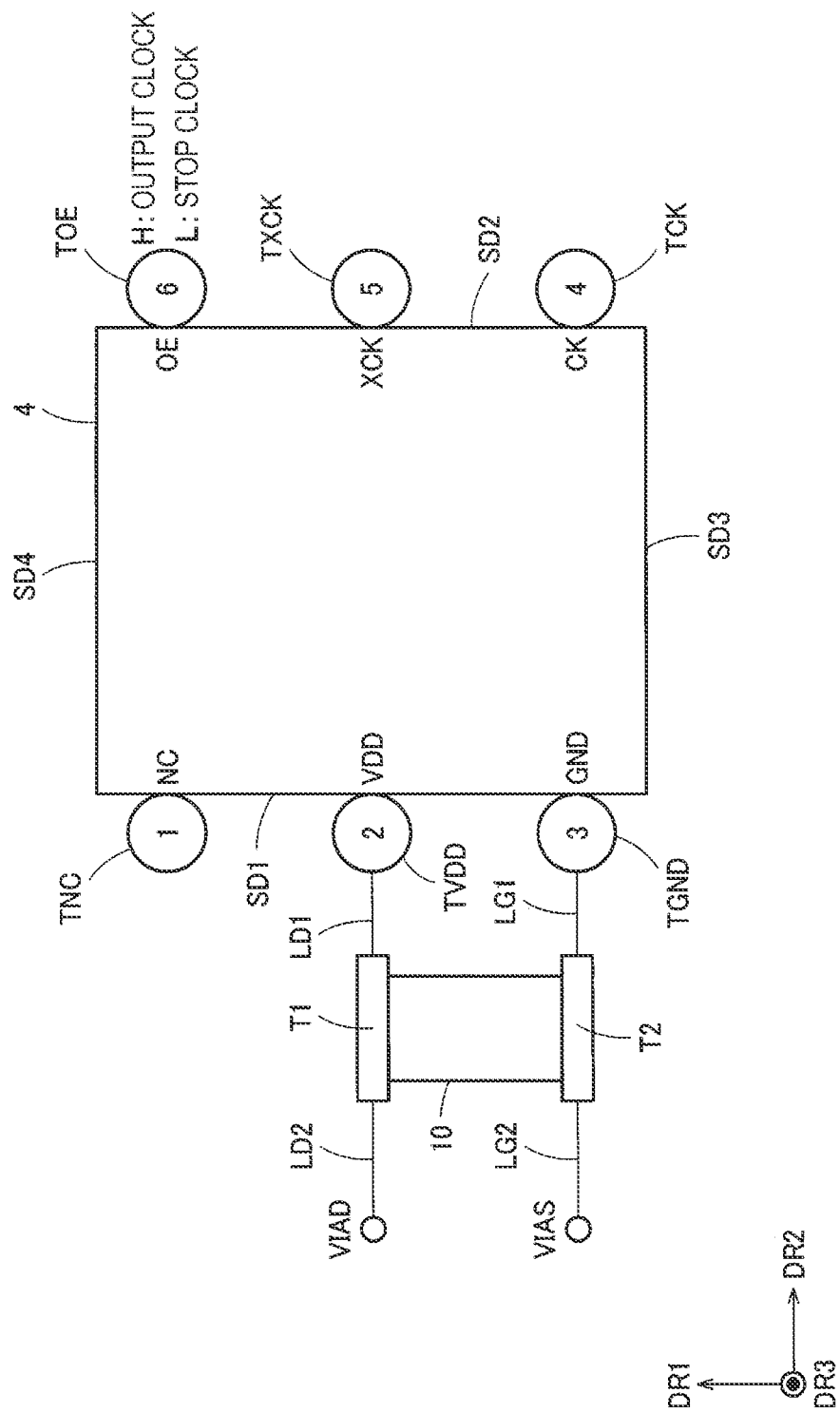
FIG. 6 is a diagram showing a first modified example of the oscillator according to the embodiment.
Figure 14:
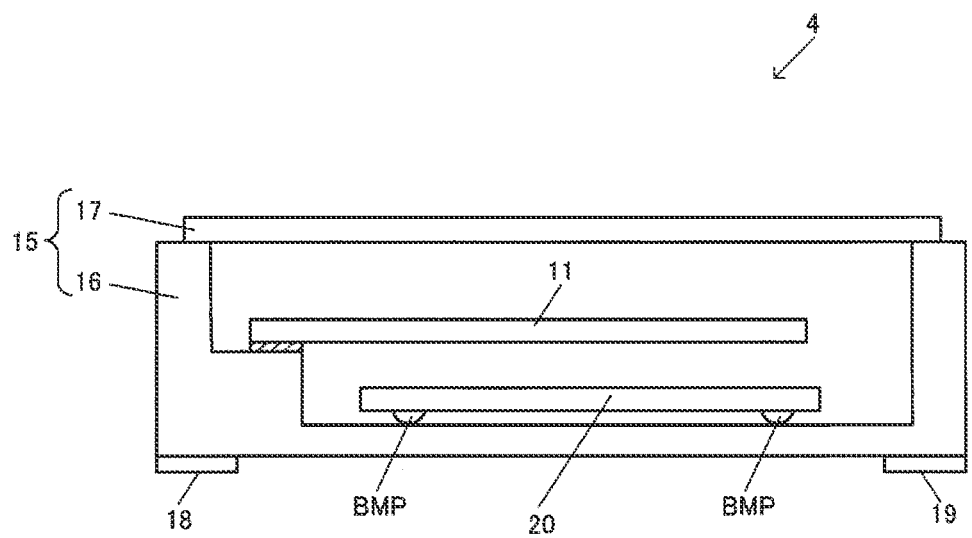
FIG. 14 is a diagram showing a first structural example of the oscillator.
Figure 15:
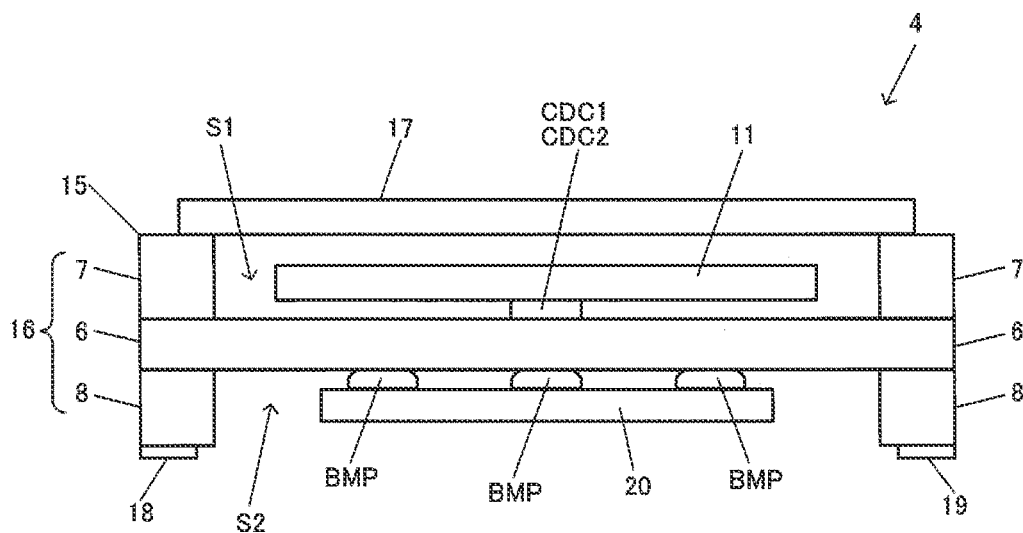
FIG. 15 is a diagram showing a second structural example of the oscillator.

In other words, the oscillator 4 shown in FIG. 1 is a six-terminal oscillator. The terminals are each called a pin. The oscillator 4 includes, for example, a resonator 11 and a circuit device 20 as shown in FIG. 6 described later. Further, the oscillator 4 includes a package 15 as shown in FIG. 14 and FIG. 15 described later, and these terminals are disposed in the package 15 of the oscillator 4.

The output control terminal TOE is a terminal to which an output control signal OE for a positive-side clock signal CK and a negative-side clock signal XCK is input. The output control terminal TOE and the output control signal OE are respectively called an output enable terminal and an output enable signal. The output control signal OE is output by an external control device such as a micro-controller, and is input to the output control terminal TOE of the oscillator 4. In FIG. 1, the positive-side clock signal CK and the negative-side clock signal XCK are output from the oscillator 4 when the output control signal OE is in a high level, and the output of each of the positive-side clock signal CK and the negative-side clock signal XCK from the oscillator 4 is stopped when the output control signal OE is in a low level. A state in which the positive-side clock signal CK and the negative-side clock signal XCK are output is referred to as an enabled state of the output of the clock signals, and a state in which the output of each of the positive-side clock signal CK and the negative-side clock signal XCK is stopped is referred to as a disabled state of the clock signals. It should be noted that in the present embodiment, the high level and the low level are respectively described as "H" and "L" for the sake of convenience.

The ground terminal TGND is a terminal from which a low potential-side power supply voltage is supplied. The low potential-side power supply voltage is GND, and is called, for example, a ground voltage, and is, for example, a ground potential. GND is also called VSS.

The power supply terminal TVDD is a terminal from which a high potential-side power supply voltage is supplied. The high potential-side power supply voltage is VDD, and is a voltage higher in potential than GND. VDD is supplied from, for example, an external power supply device.

The positive-side clock terminal TCK and the negative-side clock terminal TXCK are terminals for outputting the positive-side clock signal CK and the negative-side clock signal XCK, respectively. It should be noted that in the following description, the positive-side clock terminal TCK and the negative-side clock terminal TXCK are also referred to collectively as clock terminals, and the positive-side clock signal CK and the negative-side clock signal XCK are also referred to collectively as a clock signal. Here, as the clock signal, a differential clock signal CK, XCK is output. For example, the positive-side clock signal CK and the negative-side clock signal XCK are output from the positive-side clock terminal TCK and the negative-side clock terminal TXCK, respectively, when the output control signal OE is in the high level, and the output of each of the positive-side clock signal CK from the positive-side clock terminal TCK and the negative-side clock signal XCK from the negative-side clock terminal TXCK is stopped when the output control signal OE is in the low level. It should be noted that the clock terminals can be a terminal for outputting a single-ended clock signal.

Figure 2:
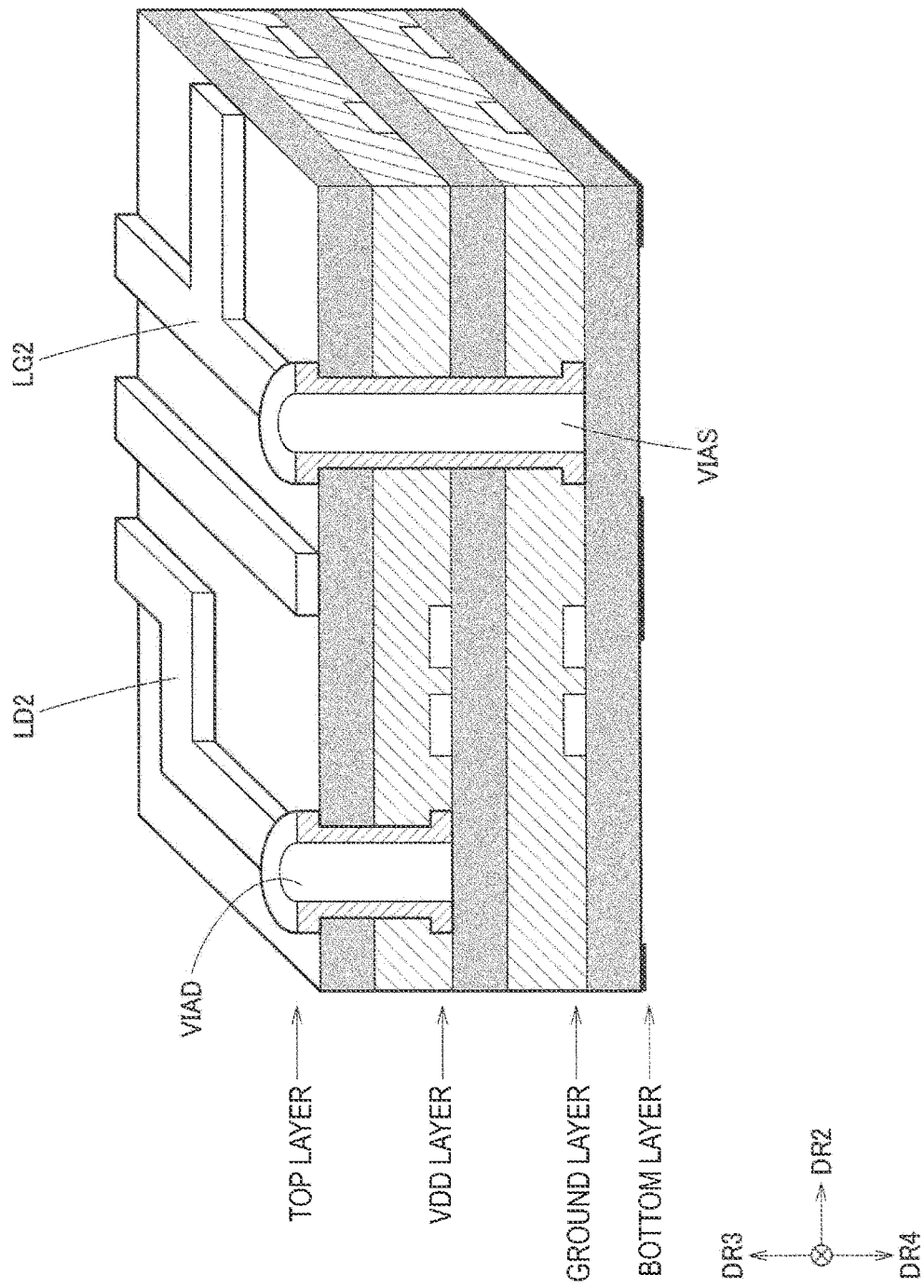
FIG. 2 is a schematic diagram showing an example of a cross-sectional structure of a circuit board.

Further, the ground terminal TGND is coupled to a via VIAS with ground lines LG1, LG2, and the via VIAS is coupled to a ground layer. FIG. 2 is a schematic diagram showing an example of a cross-sectional structure of a circuit board on which the oscillator 4 is mounted. As shown in FIG. 2, the circuit board includes, for example, a top layer, a VDD layer, the ground layer, and a bottom layer. The obverse extreme surface at the third direction DR3 side is set as the top layer, and on the top layer, there are mounted a variety of components such as the oscillator 4, interconnections coupled to the terminals of the oscillator 4, and capacitors. The power supply voltage VDD is supplied from, for example, the VDD layer, and the ground potential is supplied from, for example, the ground layer. The bottom layer is arranged at the fourth direction DR4 side, namely the reverse surface side, of the circuit board, and interconnections are disposed, and in addition, a variety of components are mounted, similarly to the top layer.

In the schematic diagram of the cross-sectional structure shown in FIG. 2, on the top layer at the third direction DR3 side, there are disposed, for example, the ground lines LG1, LG2 of the oscillator 4 shown in FIG. 1. In the cross-sectional view of the schematic diagram in FIG. 2, the via VIAS is disposed to couple the ground line LG2 disposed on the top layer of the circuit board and the ground layer to each other. As described above, the ground potential is supplied to the ground terminal TGND of the oscillator 4 via the ground lines LG1, LG2 and the via VIAS.

Further, the power supply terminal TVDD is coupled to a via VIAD with power supply lines LD1, LD2, and the via VIAD is coupled to the VDD layer. As shown in the schematic diagram of the cross-sectional structure shown in FIG. 2, the via VIAD is disposed to couple the power supply line LD2 in the top layer and the VDD layer to each other. As described above, the power supply terminal TVDD of the oscillator 4 is supplied with the power supply voltage VDD via the power supply lines LD1, LD2 and the via VIAD.

Further, in the present embodiment, it is possible to dispose a capacitor 10 between the power supply terminal TVDD and the ground terminal TGND as shown in FIG. 1. A first terminal T1 of the capacitor 10 is coupled to, for example, the power supply lines LD1, LD2, and a second terminal T2 of the capacitor 10 is coupled to the ground lines LG1, LG2. By placing the capacitor 10 as a decoupling capacitor between the power supply terminal TVDD and the ground terminal TGND, it is possible to reduce the power supply noise. In this case, when a via is located on a path between the power supply terminal TVDD and the first terminal T1 of the capacitor 10, or a path between the ground terminal TGND and the second terminal T2 of the capacitor 10, the effect such as a reduction of the power supply noise by the capacitor 10 is impaired on the grounds of a parasitic inductance due to the via and so on. In this regard, since no via is located on these paths in the present embodiment, it is possible to prevent the effect obtained by placing the capacitor 10 from being impaired. As a result, there is obtained an effect that the power supply noise of the oscillator 4 is rejected to make an oscillation clock low in jitter.

The oscillator according to the present embodiment includes the power supply terminal TVDD, the ground terminal TGND, the positive-side clock terminal TCK, and the negative-side clock terminal TXCK. The power supply terminal TVDD is supplied with the high potential-side power supply voltage. The ground terminal TGND is supplied with the low potential-side power supply voltage. The positive-side clock terminal TCK outputs the positive-side clock signal CK of the differential clock signal. The negative-side clock terminal TXCK outputs the negative-side clock signal XCK of the differential clock signal. The power supply terminal TVDD and the ground terminal TGND are arranged side by side, and the negative-side clock terminal TXCK and the positive-side clock terminal TCK are arranged side by side.

According to the present embodiment, since the power supply terminal TVDD and the ground terminal TGND are arranged side by side, it is possible to arrange the power supply terminal TVDD and the ground terminal TGND side by side on arbitrary one side of the oscillator 4. Further, since the positive-side clock terminal TCK and the negative-side clock terminal TXCK are arranged side by side, it is possible to arrange the negative-side clock terminal TXCK and the positive-side clock terminal TCK side by side on arbitrary one side of the oscillator 4.

Therefore, when coupling the capacitor 10 between the power supply terminal TVDD and the ground terminal TGND of the oscillator 4 on, for example, the circuit board as shown in FIG. 1, since the power supply terminal TVDD and the ground terminal TGND are arranged on, for example, the first side SD1 side by side, it is possible to shorten the distance between the capacitor 10, and the power supply terminal TVDD and the ground terminal TGND. When it is possible to shorten the distance between the capacitor 10, and the power supply terminal TVDD and the ground terminal TGND, it becomes possible to realize a configuration in which no via is disposed in the middle of the interconnection which couples the power supply terminal TVDD or the ground terminal TGND of the oscillator 4 and the capacitor 10 to each other. Therefore, it is possible to realize the configuration in which no via is disposed on the power supply line LD1 and the ground line LG1 for coupling the capacitor 10 and the oscillator 4 to each other, the parasitic inductance is minimized, and it becomes difficult for the effect of the capacitor 10 as the decoupling capacitor to be impaired.

As described above, by devising the assignment of the power supply terminals to make, for example, the power supply terminal TVDD and the ground terminal TGND adjacent to each other on the same side of the oscillator 4 in the terminal assignment of the oscillator 4 as a six-terminal differential output oscillator, it becomes possible to provide the bypass capacitor for coupling the power supply terminals to each other with ideal connection low in parasitic inductance. Thus, it is possible to realize an improvement in signal quality of the positive-side clock signal CK and the negative-side clock signal XCK as the output clock.

Further, by arranging the power supply terminal TVDD and the ground terminal TGND on the same side of the oscillator 4, it is possible to arrange the decoupling capacitor so as to minimize the equivalent series inductance. As a result, since the insertion loss of the decoupling capacitor is minimized, the noise rejection effect by the decoupling capacitor is maximized, and thus, the noise of the power supply of the oscillator 4 is effectively rejected. Therefore, it is possible to make the output clock of the oscillator low in jitter.

Figure 3:
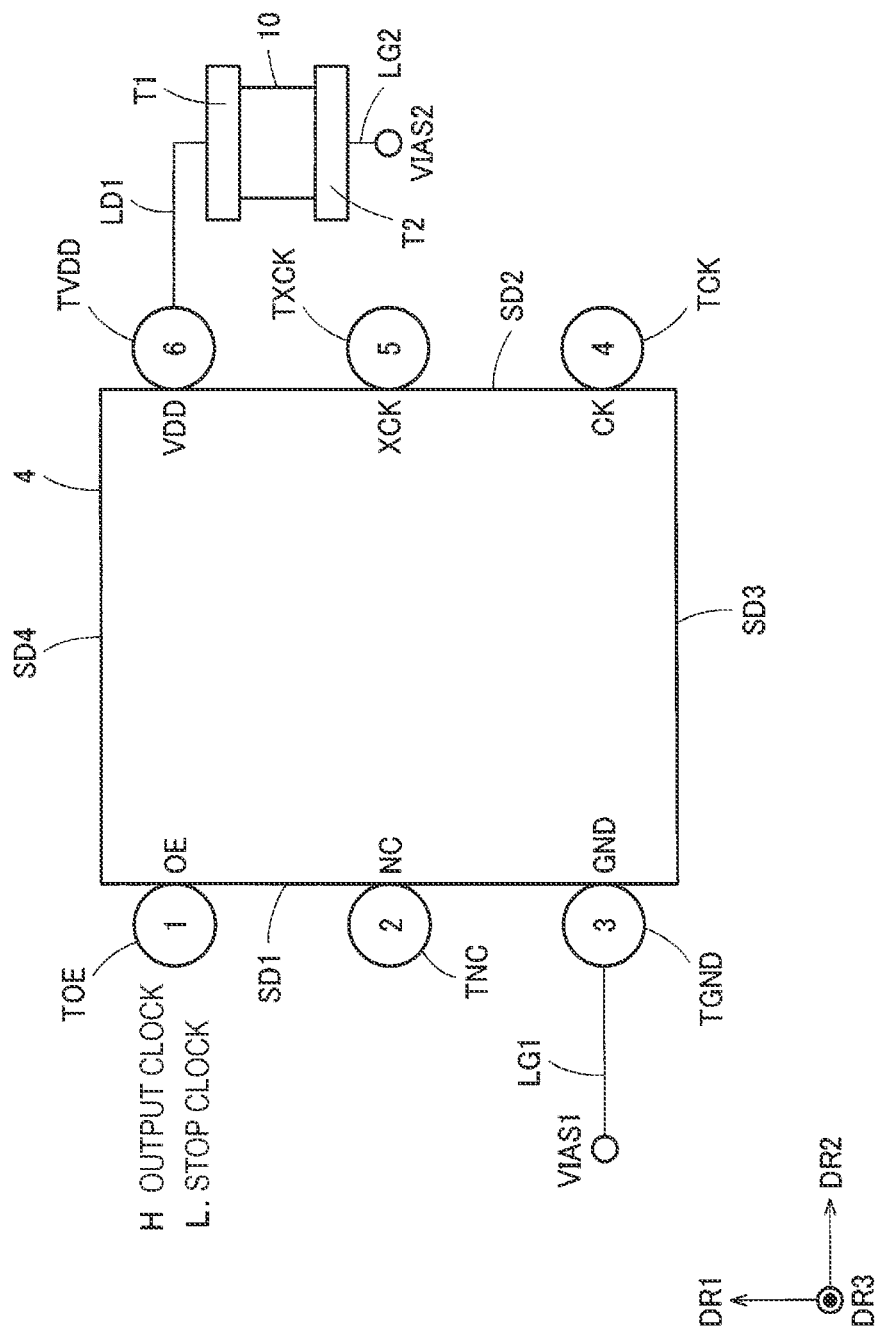
FIG. 3 is a diagram showing a layout example of a capacitor in a related-art oscillator.

FIG. 3 is a configuration example of the oscillator disclosed in Document 1 and so on, and shows a pin layout of the six-terminal differential output oscillator as the current standard. The pin layout shown in FIG. 3 is different in arrangement of the power supply terminal TVDD and the terminal TNC compared to the pin layout in the oscillator 4 according to the present embodiment shown in FIG. 1. Specifically, the pin layout as an industry standard shown in FIG. 3 is a layout obtained by exchanging the power supply terminal TVDD as the second terminal and the terminal TNC as the sixth terminal in the oscillator 4 according to the present embodiment shown in FIG. 1, wherein the terminal TNC is assigned to the second terminal, and the power supply terminal TVDD is assigned to the sixth terminal. Specifically, the power supply terminal TVDD and the ground terminal TGND are disposed separately on two sides different from each other, namely the first side SD1 and the second side SD2.

Therefore, in the configuration shown in FIG. 3, the connection to the second terminal T2 as the terminal at the ground side of the capacitor 10 from the ground terminal TGND is achieved via the ground line LG1, vias VIAS1, VIAS2, and the ground line LG2. Therefore, a current path becomes to be located at the ground side of the capacitor 10 via the vias VIAS1, VIAS2, and it results in that the parasitic inductance is generated.

As described above, in the pin layout of the clock oscillator having the differential output as the current standard, the power supply terminal TVDD and the ground terminal TGND are arranged at diagonal positions of the oscillator 4. When this terminal layout is adopted, the via becomes to inevitably be located in the coupling path of the decoupling capacitor, and the via has the parasitic inductance, and therefore, impairs the effect of the decoupling capacitor.

Figure 4:
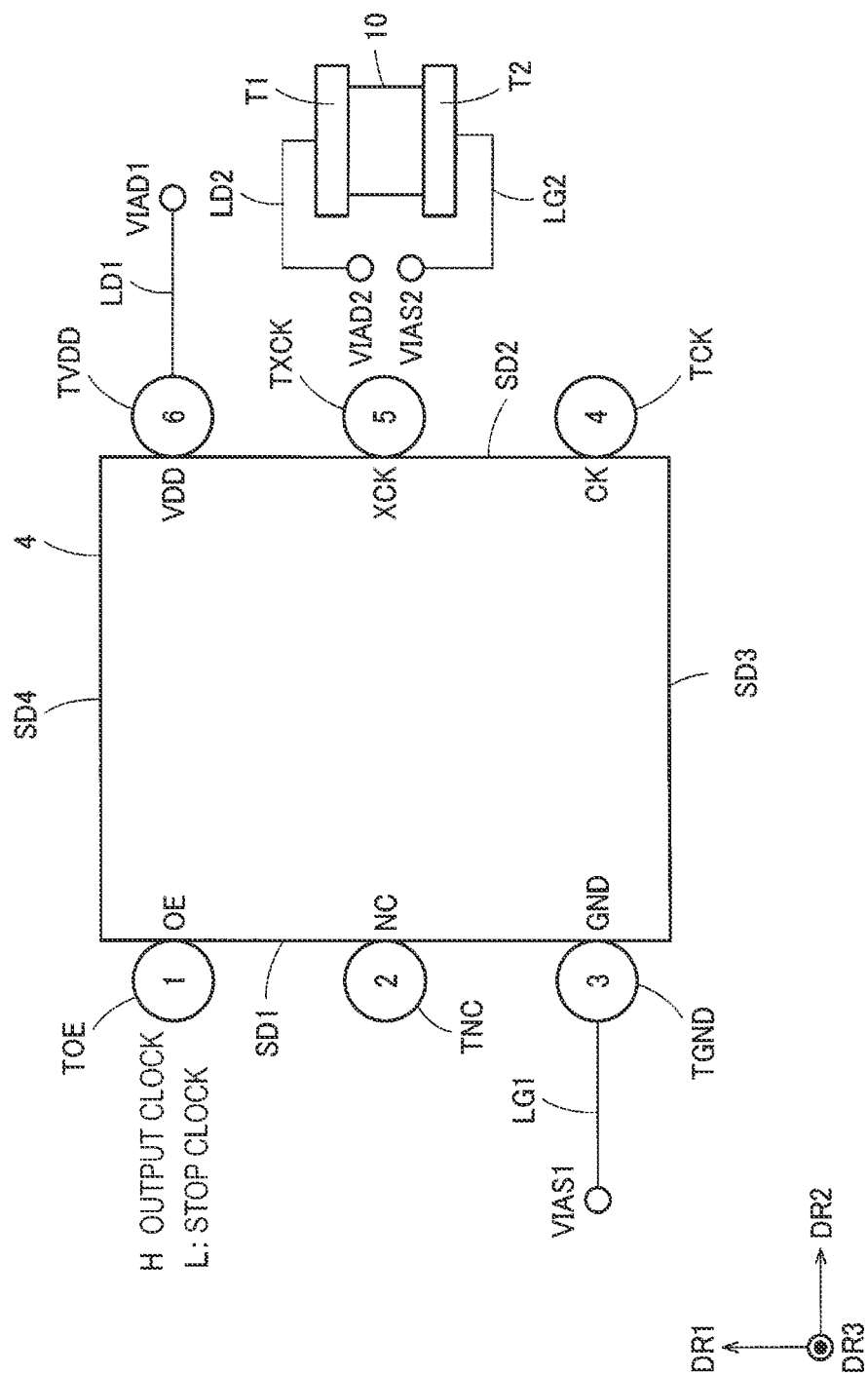
FIG. 4 is a diagram showing another layout example of a capacitor in the related-art oscillator.

FIG. 4 shows one of layout examples of the decoupling capacitor which is assumed when adopting the pin layout disclosed in Document 1 and so on. In the layout example shown in FIG. 4, the oscillator 4 and the capacitor 10 are coupled via the vias VIAS, the vias VIAD, the VDD layer of the circuit board, and the ground layer of the circuit board.

When the configuration example shown in FIG. 4 is adopted, the ground terminal TGND is coupled to the second terminal T2 as the terminal at the GND side of the capacitor 10 via the ground line LG1, the via VIAS1, the ground layer, the via VIAS2, and the ground line LG2. Further, the power supply terminal TVDD is coupled to the first terminal T1 as a terminal at the VDD side of the capacitor 10 via the power supply line LD1, the via VIAD1, the VDD layer, the via VIAD2, and the power supply line LD2. Therefore, a via is located between the terminal of the oscillator 4 and the terminal of the capacitor 10, and the effect of the capacitor 10 reducing the power supply noise is lost on the grounds of the parasitic inductance due to the interconnection of the via.

In this regard, in the oscillator 4 according to the present embodiment, since the power supply terminal TVDD and the ground terminal TGND are arranged side by side on, for example, the first side SD1 as described above, it is possible to shorten the distance from the capacitor 10 to the power supply terminal TVDD and the ground terminal TGND. Further, it is possible to realize the configuration in which no via is disposed on the power supply line LD1 and the ground line LG1 for coupling the capacitor 10 and the oscillator 4 to each other, and it is possible to make the effect of the capacitor 10 as the decoupling capacitor difficult to be impaired.

Further, in the oscillator 4 according to the present embodiment, the power supply terminal TVDD and the ground terminal TGND are arranged side by side along the first side SD1 of the oscillator 4, and the negative-side clock terminal TXCK and the positive-side clock terminal TCK are arranged side by side along the second side SD2 as an opposite side to the first side SD1.

In this way, the power supply terminal TVDD and the ground terminal TGND are disposed side by side on the first side SD1 of the oscillator 4, and the negative-side clock terminal TXCK and the positive-side clock terminal TCK are disposed side by side on the second side SD2 as the opposite side to the first side SD1. Therefore, it is possible to prevent the power supply terminal TVDD and the ground terminal TGND from being disposed separately on the two sides as the opposite sides of the oscillator 4. Further, it is also possible to prevent the negative-side clock terminal TXCK and the positive-side clock terminal TCK from being disposed separately on the two sides as the opposite sides of the oscillator 4. For example, regarding the negative-side clock terminal TXCK and the positive-side clock terminal TCK, it becomes possible to adopt a terminal layout substantially the same as the standard terminal layout as shown in FIG. 4. Thus, it becomes possible to supply the negative-side clock signal XCK and the positive-side clock signal CK from the negative-side clock terminal TXCK and the positive-side clock terminal TCK to a supply-destination device of the clock with interconnections equal in length to each other in the standard wiring. Further, it becomes possible to supply the negative-side clock signal XCK and the positive-side clock signal CK from the negative-side clock terminal TXCK and the positive-side clock terminal TCK to the supply-destination device of the clock with a short path.

Further, the oscillator 4 according to the present embodiment includes the output control terminal TOE to which the output control signal OE for the clock signals CK, XCK is input, and the output control terminal TOE, the power supply terminal TVDD, and the ground terminal TGND are arranged side by side along the first side SD1.

In this way, regarding the output control terminal TOE, it becomes possible to adopt substantially the same terminal layout as the standard terminal layout shown in FIG. 4. Further, it becomes possible to input the output control signal from an external control device arranged on the first side SD1 of the oscillator 4 to the output control terminal TOE with a short path.

2. Failure Diagnosis

In recent years, a requirement for reliability has increased with respect to the oscillator 4. For example, in the purpose such as in-car use, it is desired that it is possible for the oscillator 4 to perform a self-failure diagnosis to output the failure diagnosis result to the outside.

Figure 5:
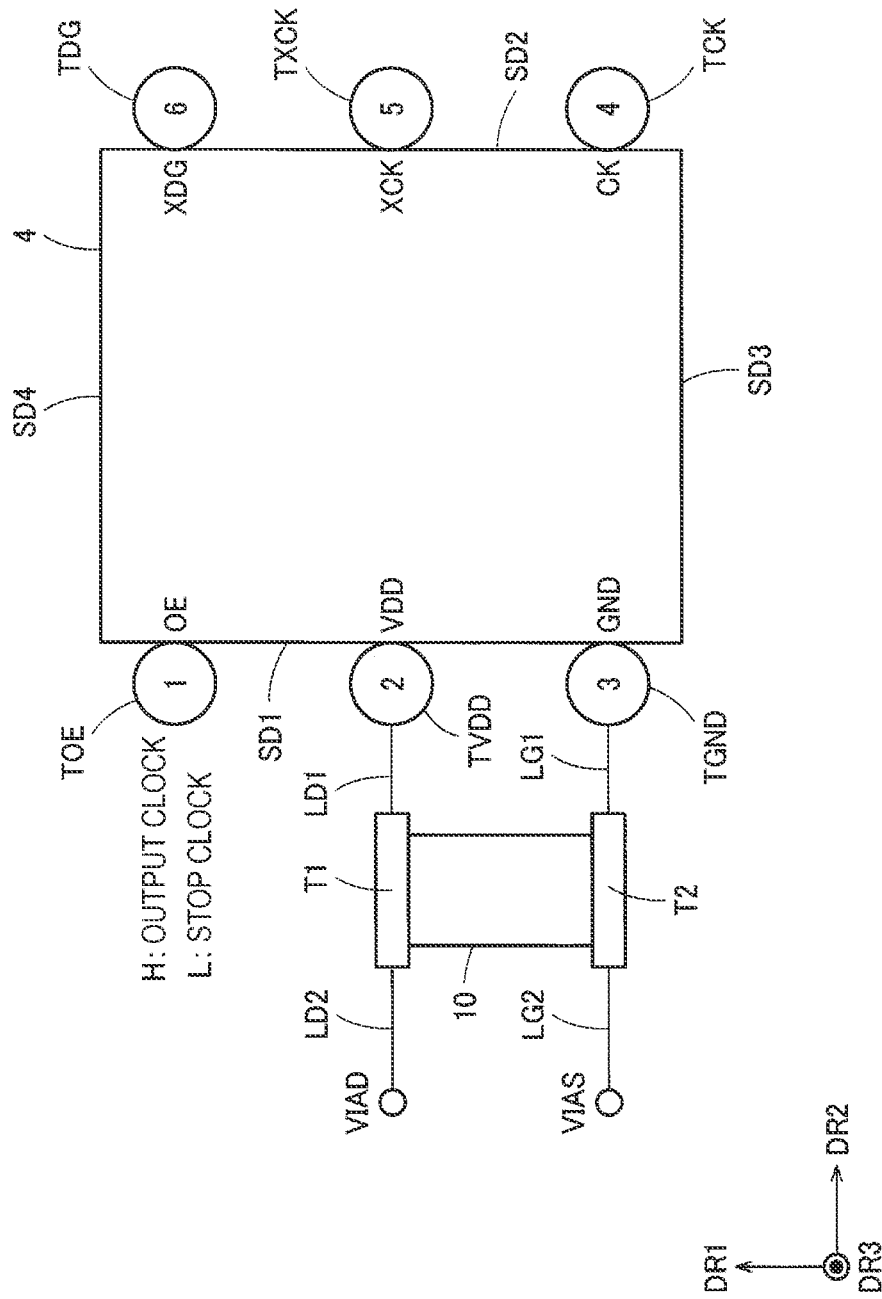
FIG. 5 is a diagram showing a second configuration example of the oscillator according to the embodiment.

FIG. 5 shows a second configuration example of the present embodiment. The second configuration example is different from the first configuration example shown in FIG. 1 in the point that the sixth terminal is assigned to a failure diagnostic terminal TDG. The failure diagnostic terminal TDG is a terminal for outputting a failure diagnostic signal XDG. The failure diagnostic signal XDG is a signal representing a result of the failure diagnosis performed in, for example, the oscillator 4. As shown in, for example, FIG. 9 described later, the circuit device 20 of the oscillator 4 is provided with a failure diagnostic circuit 50, and when it is diagnosed by the failure diagnostic circuit 50 that a failure has occurred, the failure diagnostic signal XDG is output from the failure diagnostic terminal TDG. For example, the failure diagnostic signal XDG is set at an active level, and is then output. The failure diagnosis can be said to be called failure detection, and the failure diagnostic terminal TDG and the failure diagnostic signal XDG can be said to be a failure detection terminal and a failure detection signal, respectively. In the second configuration example shown in FIG. 5, when the failure diagnostic signal XDG output from the failure diagnostic terminal TDG is at the low level, it is represented that a failure has been detected, and when the failure diagnostic signal XDG is at the high level, it is represented that no failure has occurred, and a normal operation has been performed.

Further, in the present embodiment, a first-logic output control signal as either one of a positive-logic signal and a negative-logic signal is input to the output control terminal TOE. On the other hand, the failure diagnostic terminal TDG outputs the second-logic failure diagnostic signal XDG as another of a positive-logic signal and a negative-logic signal. For example, in the second configuration example, the positive-logic output control signal OE as the first-logic signal is input to the output control terminal TOE, and the failure diagnostic terminal TDG outputs the negative-logic failure diagnostic signal XDG as the second-logic signal. It should be noted that the present embodiment is not limited to the above, and it is possible to input the negative-logic output control signal XOE as the first-logic signal to the output control terminal TOE, and it is possible for the failure diagnostic terminal TDG to output the positive-logic failure diagnostic signal DG as the second-logic signal. It should be noted that in the present embodiment, "X" represents that the signal is a negative-logic signal.

The positive-logic signal is a signal the high level of which represents that the signal is active. The positive-logic signal represents the inactive state when the signal is at, for example, the low level. The negative-logic signal is a signal the low level of which represents that the signal is active. The negative-logic signal represents the inactive state when the signal is at, for example, the high level. The active state and the inactive state are also called an asserted state and a de-asserted state, respectively. The de-asserted state is also called a de-asserted state, a dessert state, and a negated state.

For example, the positive-logic output control signal OE represents that the signal is active when the signal is at the high level, and the clock signals CK, XCK are output from the oscillator 4. Further, the output control signal OE represents that the signal is inactive when the signal is at the low level, and the output of the clock signals CK, XCK are stopped. On the other hand, the negative-logic failure diagnostic signal XDG represents that the signal is active when the signal is at the low level, and the fact that a failure has been detected is represented. Further, the failure diagnostic signal XDG represents that the signal is inactive when the signal is at the high level, and the fact that no failure has not been detected, and the oscillator 4 operates normally.

As described above, the failure diagnosis is performed inside the oscillator 4, and when a failure is detected, the failure diagnostic signal XDG is output from the failure diagnostic terminal TDG. In this way, the failure diagnosis of the oscillator 4 becomes possible, and it becomes possible to realize the oscillator 4 which is high in reliability, and is therefore suitable for the in-car use and so on. It becomes possible to detect a failure which has occurred during the operation of, for example, the oscillator 4 in real time, and inform the outside of the failure thus detected.

It should be noted that there is described when the output control signal OE is a positive-logic signal, and the failure diagnostic signal XDG is a negative-logic signal in the above description, but it is possible to replace the signals with the output control signal OE as a negative-logic signal and the failure diagnostic signal XDG as a positive-logic signal in any of the configuration examples of the present embodiment. Further, instead of setting the failure diagnostic signal XDG at the high level, it is possible to set the failure diagnostic terminal TDG in a high-impedance state, and to pull-up the failure diagnostic terminal TDG with a pull-up resistor to the high level. Further, the above description when placing the failure diagnostic terminal TDG can be applied not only to the second configuration example, but also to other oscillators 4 including the first configuration example.

Specifically, the oscillator 4 according to the present embodiment includes the failure diagnostic terminal TDG for outputting the failure diagnostic signal DIAG, and the failure diagnostic terminal TDG, the negative-side clock terminal TXCK, and the positive-side clock signal TCK are arranged along the second side SD2.

In this way, it becomes possible to output the failure diagnostic signal XDG from the failure diagnostic terminal TDG disposed on the second side SD2. It becomes possible to inform the external control device of an occurrence of the failure with the failure diagnostic signal XDG when, for example, the failure is detected.

3. Modified Examples

FIG. 6 shows a first modified example of the present embodiment. The first modified example is a configuration obtained by exchanging the first terminal and the sixth terminal in the first configuration example shown in FIG. 1. In other words, the terminal TNC, the power supply terminal TVDD, the ground terminal TGND are disposed along the first side SD1, and the output control terminal TOE, the negative-side clock terminal TXCK, and the positive-side clock terminal TCK are disposed along the second side SD2.

In other words, the oscillator 4 according to the present embodiment includes the output control terminal TOE to which the output control signal OE for the clock signals CK, XCK is input, and the output control terminal TOE, the negative-side clock terminal TXCK, and the positive-side clock terminal TCK are arranged side by side along the second side SD2.

In this way, it is possible to prevent the output control terminal TOE, the negative-side clock terminal TXCK, and the positive-side clock terminal TCK from being disposed separately on the two sides as the opposite sides of the oscillator 4.

Figure 7:
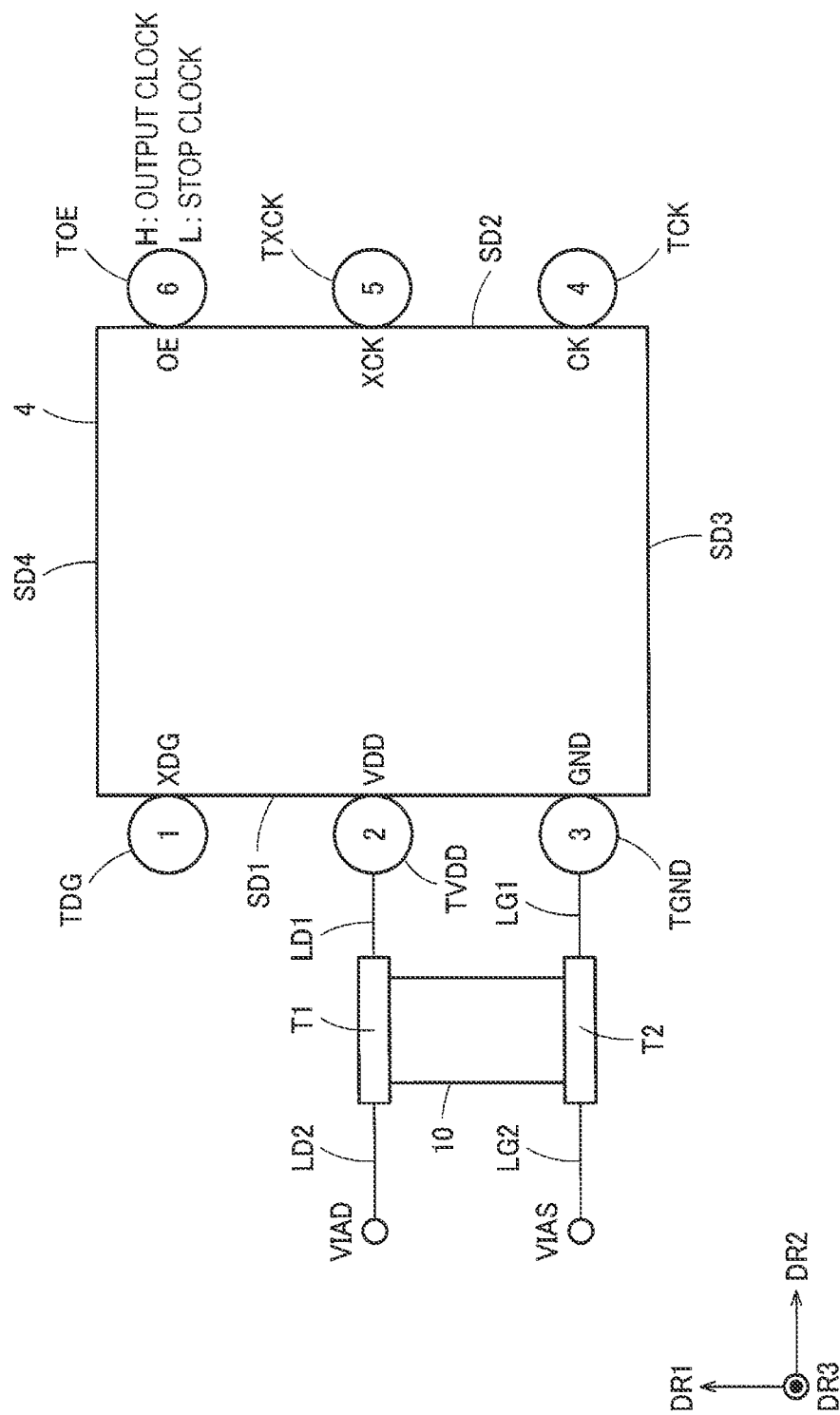
FIG. 7 is a diagram showing a second modified example of the oscillator according to the embodiment.

FIG. 7 shows a second modified example of the present embodiment. The second modified example is a configuration obtained by exchanging the first terminal and the sixth terminal in the second configuration example shown in FIG. 5. In other words, the failure diagnostic terminal TDG, the power supply terminal TVDD, the ground terminal TGND are disposed along the first side SD1, and the output control terminal TOE, the negative-side clock terminal TXCK, and the positive-side clock terminal TCK are disposed along the second side SD2.

Specifically, the oscillator 4 according to the present embodiment includes the failure diagnostic terminal TDG for outputting the failure diagnostic signal XDG, and the failure diagnostic terminal TDG, the power supply terminal TVDD, and the ground terminal TGND are arranged side by side along the first side SD1.

In this way, it is possible to prevent the failure diagnostic terminal TDG, the power supply terminal TVDD, and the ground terminal TGND from being disposed separately on the two sides as the opposite sides of the oscillator 4.

Figure 8:
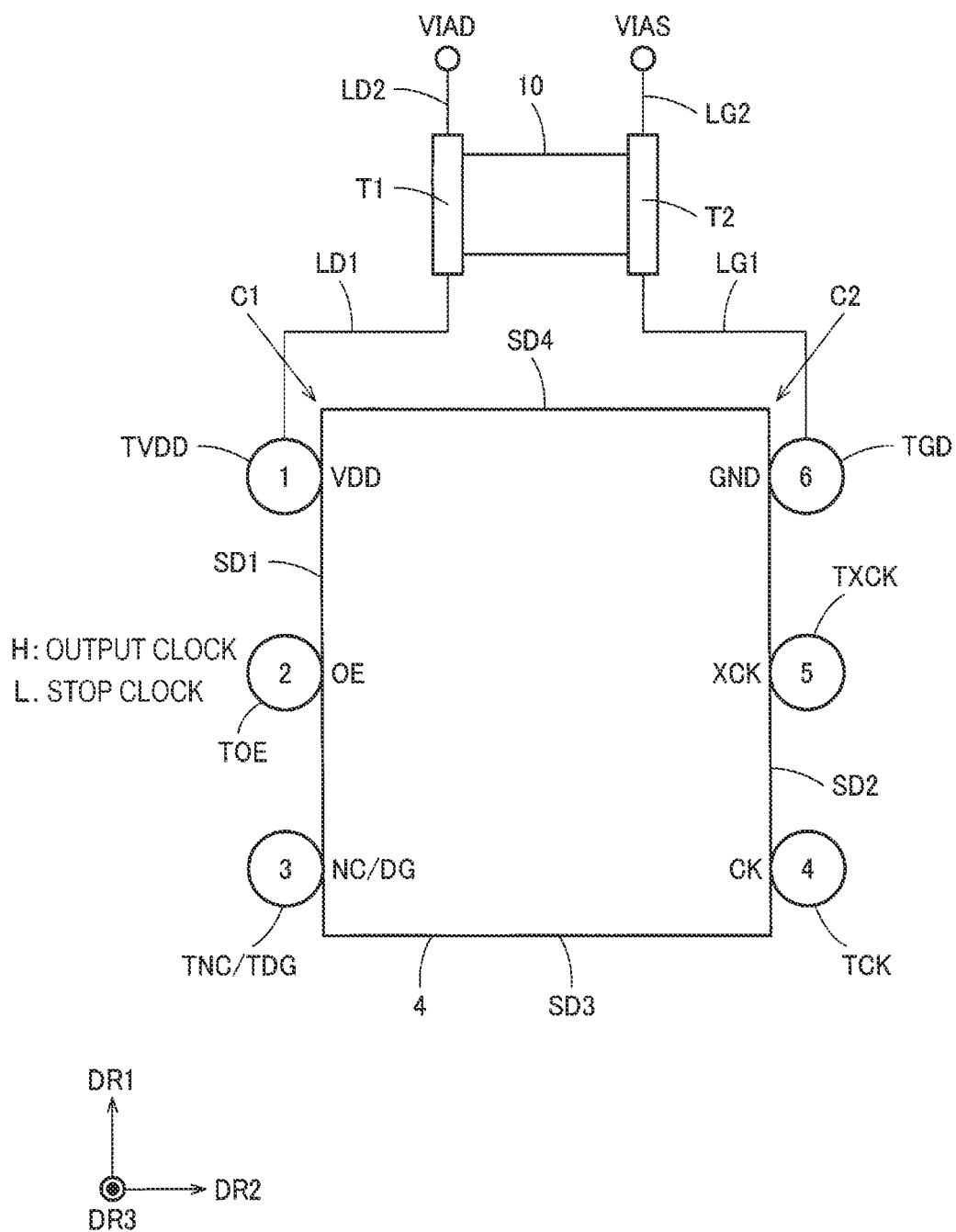
FIG. 8 is a diagram showing a third configuration example of the oscillator according to the embodiment.

FIG. 8 shows a third configuration example of the oscillator 4 according to the present embodiment. In the third configuration example, unlike the first configuration example shown in FIG. 1, the power supply terminal TVDD is assigned to the first terminal, the output control terminal TOE is assigned to the second terminal, the terminal TNC is assigned to the third terminal, and the ground terminal TGND is assigned to the sixth terminal. In other words, although power supply terminal TVDD and the ground terminal TGND are arranged side by side on the first side SD1 of the oscillator in the first configuration example shown in FIG. 1, the power supply terminal TVDD is disposed on the first side SD1, and the ground terminal TGND is disposed on the second side SD2 in the third configuration example. Further, the power supply terminal TVDD and the ground terminal TGND are arranged to respectively be disposed in the corners at both ends of the fourth side SD4 of the oscillator 4. Here, in FIG. 8, the corner part where the first side SD1 and the fourth side SD4 of the oscillator 4 cross each other is referred to as a first corner part C1, and the corner part where the second side SD2 and the fourth side SD4 cross each other is referred to as a second corner part C2.

Therefore, in the third configuration example shown in FIG. 8, when coupling the capacitor 10 between the power supply terminal TVDD and the ground terminal TGND, by arranging the capacitor 10 at a position close to the fourth side SD4, it is possible to shorten the distance from the capacitor 10 to the power supply terminal TVDD and the ground terminal TGND. Therefore, it is possible to realize the configuration in which no via is disposed in the middle of the interconnection for coupling the capacitor 10 from the power supply terminal TVDD or the ground terminal TGND of the oscillator 4, and thus, it becomes difficult for the effect of the capacitor 10 as the decoupling capacitor to be impaired.

In other words, in the oscillator 4 according to the present embodiment, when defining a side opposed to the first side SD1 of the oscillator 4 as the second side SD2, a side crossing the first side SD1 and the second side SD2 as the third side SD3, and a side opposed to the third side SD3 as the fourth side SD4, the power supply terminal TVDD is arranged on the first corner part C1 where the first side SD1 and the fourth side SD4 cross each other. Further, the ground terminal TGND is arranged on the second corner C2 where the second side SD2 and the fourth side SD4 cross each other.

In this way, it is possible to arrange the power supply terminal TVDD and the ground terminal TGND at both ends of the fourth side SD4, and it is possible to arrange the power supply terminal TVDD and the ground terminal TGND at the fourth side SD4 side in a lump.

Further, in the third configuration example, it is possible to use the terminal TNC in the third terminal as the failure diagnostic terminal TDG described above.

The oscillator 4 according to the present embodiment includes the output control terminal TOE to which the output control signal OE for the clock signal is input, and the failure diagnostic terminal TDG for outputting the failure diagnostic signal XDG. To the output control terminal TOE, there is input the first-logic output control signal OE as one of a positive-logic signal and a negative-logic signal, and the failure diagnostic terminal TDG outputs the second-logic failure diagnostic signal XDG as the other of a positive-logic signal and a negative-logic signal.

In this way, since the failure diagnostic signal XDG becomes a negative-logic signal when the output control signal OE is a positive-logic signal, and the failure diagnostic signal XDG becomes a positive-logic signal when the output control signal OE is a negative-logic signal, it becomes possible to prevent the situation in which the clock signals CK, XCK stop even when a short-circuit failure occurs between the interconnection of the output control signal OE and the interconnection of the failure diagnostic signal XDG. Therefore, it becomes possible to realize the failure diagnosis of the oscillator 4, and at the same time, it becomes possible to prevent the problem such as stoppage of clock output caused by the short-circuit failure or the like from occurring.

Further, according to the third configuration example, since the terminals to which the destination element is common are arranged in a lump on each of the sides of the oscillator 4, the layout of the elements in an IC chip becomes easy. For example, in the second configuration example, the terminals related to the power supply are collected at the fourth side SD4 side, and it is easy to place the decoupling capacitor in the vicinity of the oscillator 4. In this way, it is possible to make the equivalent series inductance low, and it is possible to achieve the reduction of the noise and the minimization of the area of the electronic board. Further, at the first side SD1 side, there are collected the terminals of the control signals such as the output control terminal TOE and the failure diagnostic terminal TDG, and it becomes easy to achieve wiring to logic terminals of the control device such as an MCU (Micro Controller Unit) as the coupling destination. Specifically, since intersections between the power supply interconnections and the interconnections of the clock signals do not occur, the signal deterioration due to the interference between the electric signals is difficult to occur. Further, at the second side SD2 side, by surrounding the clock signal interconnections to be coupled to the negative-side clock terminal TXCK, the positive-side clock terminal TCK, and so on with the interconnections to be coupled to the ground terminal TGND, it is possible to prevent the noise from being added to the clock signals CK, XCK.

4. Detailed Configuration Example of Oscillator

Figure 9:
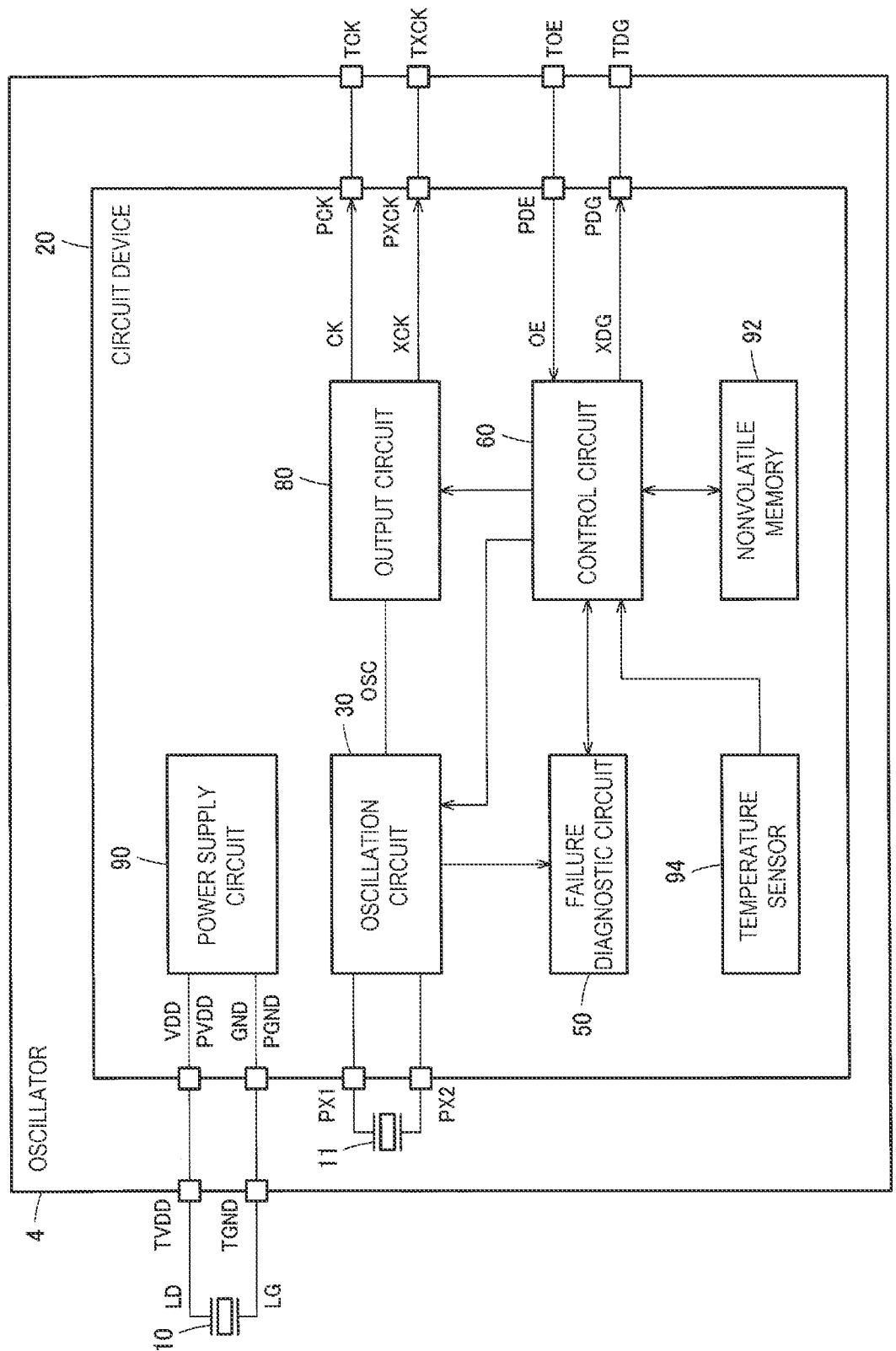
FIG. 9 is a diagram showing a detailed configuration example of the oscillator according to the embodiment.

FIG. 9 shows a detailed configuration example of the oscillator 4 according to the present embodiment. The oscillator 4 according to the present embodiment includes, for example, the resonator 11 and the circuit device 20. The resonator 11 is electrically coupled to the circuit device 20. The resonator 11 and the circuit device 20 are electrically coupled to each other using, for example, internal interconnections of a package for housing the resonator 11 and the circuit device 20, and bonding wires or metal bumps. It should be noted that the oscillator 4 is not limited to the configurations shown in the first configuration example and the second configuration example, and can adopt a variety of modified implementations such as elimination of some of these constituents, addition of other constituents, or displacement of some of the constituents with other constituents.

The resonator 11 is an element for generating a mechanical vibration due to an electrical signal. The resonator 11 can be realized by a resonator element such as a quartz crystal resonator element. The resonator 11 can be realized by, for example, a quartz crystal resonator element which has a cutting angle of AT-cut or SC-cut, and vibrates in a thickness-shear mode, a tuning-fork quartz crystal resonator element, or a double tuning-fork quartz crystal resonator element. The resonator 11 can be, for example, a resonator incorporated in a temperature-compensated crystal oscillator (TCXO) not equipped with a constant-temperature oven, or a resonator incorporated in an oven-controlled crystal oscillator (OCXO) equipped with the constant-temperature oven. It should be noted that the resonator 11 according to the present embodiment can also be realized by a variety of resonator elements such as a resonator element other than the thickness-shear vibration type, the tuning-fork type, or the double tuning-fork type, or a piezoelectric resonator element formed of a material other than quartz crystal. As the resonator 11, it is also possible to adopt, for example, a SAW (Surface Acoustic Wave) resonator, or a MEMS (Micro Electro-Mechanical Systems) resonator as a silicon resonator formed using a silicon substrate.

The circuit device 20 is an integrated circuit device called an IC (Integrated Circuit). For example, the circuit device 20 is an IC manufactured using a semiconductor process, and is a semiconductor chip having circuit elements formed on a semiconductor substrate. Further, the circuit device 20 includes an oscillation circuit 30, a failure diagnostic circuit 50, a control circuit 60, and an output circuit 80. Further, the circuit device 20 can include a power supply circuit 90, a nonvolatile memory 92, a temperature sensor 94, and so on.

The circuit device 20 includes pads PVDD, PGND, PX1, PX2, PCK, PXCK, POE, and PDG. The pads are each a terminal of the circuit device 20 as the semiconductor chip. For example, in a pad area, there is exposed a metal layer from a passivation film as an insulating layer, and the pads as the terminals of the circuit device 20 are formed of the metal layer thus exposed. The pads PVDD, PGND are a power supply pad and a ground pad, respectively. The power supply voltage VDD from an external power supply device is supplied to the pad PVDD. The pad PGND is a pad supplied with GND as the ground voltage. Similar to the explanation in the first configuration example shown in FIG. 1, for example, VDD corresponds to the high potential-side power supply voltage, and GND corresponds to the low potential-side power supply voltage. Pads PX1, PX2 are pads for coupling the resonator 11. The pads PCK, PXCK are pads for outputting the clock signals CK, XCK. The pad POE is a pad for inputting the output control signal OE, and the pad PDG is a pad for outputting the failure diagnostic signal XDG. The pads PVDD, PGND, PCK, PXCK, POE, and PDG are electrically coupled respectively to the terminals TVDD, TGND, TCK, TXCK, TOE, and TDG for external connection of the oscillator 4. The pads and the terminals are electrically coupled to each other using, for example, the internal interconnections of the package, the bonding wires, or the metal bumps.

The oscillation circuit 30 is a circuit for oscillating the resonator 11. For example, the oscillation circuit 30 oscillates the resonator 11 to thereby output an oscillation clock signal OSC. For example, the oscillation circuit 30 can be realized by a drive circuit for the oscillation electrically coupled to one end and the other end of the resonator 11, and passive elements such as a capacitor and a resistor. The drive circuit can be realized by, for example, a CMOS inverter circuit and a bipolar transistor. The drive circuit is a core circuit of the oscillation circuit 30, and the drive circuit performs voltage drive or current drive of the resonator 11 to thereby oscillate the resonator 11. As the oscillation circuit 30, there can be used a variety of types of oscillation circuit such as an inverter type, a Pierce type, a Colpitts type, and a Hartley type. Further, it is possible for the oscillation circuit 30 to generate the oscillation signal using an element other than the resonator 11. Further, the oscillation circuit 30 is provided with a variable capacitance circuit so that the oscillation frequency can be adjusted by adjusting the capacitance of the variable capacitance circuit. The variable capacitance circuit can be realized by a variable capacitance element such as a varactor. For example, the variable capacitance circuit can be realized by the variable capacitance element the capacitance of which is controlled based on a temperature compensation voltage. Alternatively, it is possible to realize the variable capacitance circuit with a capacitor array, and a switch array coupled to the capacitor array. It should be noted that the coupling in the present embodiment is electrical coupling. The electrical coupling means coupling capable of transmitting an electrical signal, and is coupling with which transmission of information by the electrical signal is achievable. The electrical coupling can also be coupling via a passive element or the like.

The failure diagnostic circuit 50 is a circuit which performs the failure diagnosis of the oscillator 4. The details of the failure diagnostic circuit 50 will be described later.

The control circuit 60 is, for example, a logic circuit, and performs a variety of types of control processing. For example, the control circuit 60 performs overall control of the circuit device 20, and performs control of an operation sequence of the circuit device 20. For example, the control circuit 60 performs control of circuit blocks of the circuit device 20 such as the oscillation circuit 30, the output circuit 80, and the nonvolatile memory 92. The control circuit 60 can be realized by a circuit of an ASIC (Application Specific Integrated Circuit) with automatic arrangement wiring such as a gate array.

The output circuit 80 outputs the clock signals CK, XCK based on the oscillation clock signal OSC from the oscillation circuit 30. For example, the output circuit 80 buffers the oscillation clock signal OSC from the oscillation circuit 30 to output the oscillation clock signal OSC to the pads PCK, PXCK as the clock signals CK, XCK. Then, the clock signals CK, XCK are output to the outside via the clock terminals TCK, TXCK of the oscillator 4. Specifically, the output circuit 80 outputs the differential clock signal CK, XCK to the outside in a signal format such as LVDS (Low Voltage Differential Signaling), PECL (Positive Emitter Coupled Logic), HCSL (High Speed Current Steering Logic), or differential CMOS (Complementary MOS). It should be noted that it is possible to arrange that the output circuit 80 outputs the clock signal in a signal format of single-ended CMOS.

The power supply circuit 90 is supplied with VDD as the power supply voltage from the pad PVDD and GND as the ground voltage from the pad PGND, and supplies internal circuits of the circuit device 20 with a variety of power supply voltages for the internal circuits. For example, the power supply circuit 90 supplies the circuits of the circuit device 20 such as the oscillation circuit 30 with a regulated power supply voltage obtained by regulating VDD as the power supply voltage.

The nonvolatile memory 92 is a memory which holds the memory of information even without the supply of the power. For example, the nonvolatile memory 92 is a memory which is capable of holding the memory of information even without the supply of the power, and in which the information can be rewritten. The nonvolatile memory 92 stores a variety of types of information necessary for the operation and so on of the circuit device 20. The nonvolatile memory 92 can be realized by an EEPROM (Electrically Erasable Programmable Read-Only Memory) or the like realized by an FAMOS memory (Floating gate Avalanche injection MOS memory) or an MONOS memory (Metal-Oxide-Nitride-Oxide-Silicon memory).

The temperature sensor 94 is a sensor which detects the temperature to output a temperature detection signal. Specifically, the temperature sensor 94 outputs a temperature detection voltage which varies in accordance with the environmental temperature, as the temperature detection signal. For example, the temperature sensor 94 generates the temperature detection signal using a circuit element having temperature dependency. Specifically, the temperature sensor 94 uses the temperature dependency provided to the forward voltage of, for example, the PN junction to thereby output the temperature detection signal the voltage of which changes dependently on the temperature. It should be noted that it is possible to adopt a modified implementation of using a digital type temperature sensor circuit as the temperature sensor 94. In this case, temperature detection data, for example, is output as the temperature detection signal.

Further, in the present embodiment, temperature compensation of the oscillation frequency of the oscillation circuit 30 can be performed. The temperature compensation of the oscillation frequency is the temperature compensation of the oscillation signal of the oscillation circuit 30, and the temperature compensation of the clock signals CK, XCK. The temperature compensation is performed based on, for example, the temperature detection signal from the temperature sensor 94. The temperature compensation is performed by generating a temperature compensation voltage based on, for example, the temperature detection signal from the temperature sensor 94, and then inputting the temperature compensation voltage thus generated to the oscillation circuit 30. Specifically, the temperature compensation is performed by the temperature compensation voltage to be the capacitance control voltage for the variable capacitance circuit provided to the oscillation circuit 30 being input to the variable capacitance circuit. In this case, the variable capacitance circuit of the oscillation circuit 30 is realized by a variable capacitance element such as a varactor. Further, as the temperature compensation, there is performed an analog type temperature compensation using polynomial approximation. For example, when the temperature compensation voltage for compensating the frequency-temperature characteristic of the resonator 11 is approximated by a polynomial, the analog type temperature compensation is performed based on coefficient information of the polynomial. The correction data for the temperature compensation as the coefficient information of the polynomial is stored in the nonvolatile memory 92. Alternatively, it is also possible to perform a digital type temperature compensation as the temperature compensation. For example, frequency adjustment data is obtained based on the temperature detection data from the temperature sensor 94. The frequency adjustment data is a frequency adjustment code. Further, by the capacitance value of the variable capacitance circuit of the oscillation circuit 30 being adjusted based on the frequency adjustment data thus obtained, the digital type temperature compensation is realized. In this case, the variable capacitance circuit of the oscillation circuit 30 is realized by the capacitor array having a plurality of binary-weighted capacitors, and the switch array.

As described hereinabove, the oscillator 4 according to the present embodiment includes the resonator 11 and the circuit device 20, and the circuit device 20 includes the oscillation circuit 30, the output circuit 80, the control circuit 60, and the failure diagnostic circuit 50. Further, the oscillation circuit 30 oscillates the resonator 11.

For example, the oscillation circuit 30 oscillates the resonator 11 to thereby output the oscillation clock signal OSC. The output circuit 80 outputs the clock signals CK, XCK to the clock terminals TCK, TXCK, the clock signals CK, XCK being based on the oscillation clock signal OSC from the oscillation circuit 30. For example, the output circuit 80 buffers the oscillation clock signal OSC to output the result as the clock signals CK, XCK, or buffers a signal obtained by multiplying the frequency of the oscillation clock signal OSC with a PLL circuit or the like to output the signal as the clock signals CK, XCK. To the control circuit 60, there is input the output control signal OE. For example, the control circuit 60 controls the output circuit 80 based on the output control signal OE to thereby control the output of the clock signals CK, XCK between the enabled state and the disabled state. The failure diagnostic circuit 50 performs the failure diagnosis for generating the failure diagnostic signal XDG. For example, the control circuit 60 outputs the failure diagnostic signal XDG based on the failure diagnosis result by the failure diagnostic circuit 50 to the failure diagnostic terminal TDG. In this way, it becomes possible to output the clock signals CK, XCK generated by oscillating the resonator 11 with the oscillation circuit 30 from the clock terminals TCK, TXCK with the output circuit 80. Further, by inputting the output control signal OE to the control circuit 60 via the output control terminal TOE, it becomes possible to perform the output control of the clock signals CK, XCK. Further, by outputting the failure diagnostic signal XDG based on the failure diagnosis by the failure diagnostic circuit 50 via the failure diagnostic terminal TDG, it becomes possible to inform the outside of the result of the failure diagnosis of the oscillator 4.

For example, in FIG. 9, the failure diagnostic circuit 50 monitors the oscillation signal from the oscillation circuit 30 as the failure diagnosis. For example, the failure diagnostic circuit 50 monitors whether or not the oscillation signal from the oscillation circuit 30 is in an appropriate signal state. Specifically, the monitoring of the oscillation signal is realized by monitoring a waveform and an amplitude of the oscillation signal. Then, when the failure diagnostic circuit 50 has determined that the oscillation signal is not in the appropriate signal state based on the monitoring result of the oscillation signal, the failure diagnostic signal XDG at, for example, the active level is output from the failure diagnostic terminal TDG via, for example, the control circuit 60. In the case of the negative-logic failure diagnostic signal XDG, the active level means the low level.

The oscillator 4 according to the present embodiment includes the resonator 11 and the circuit device 20. The circuit device 20 includes the oscillation circuit 30, the output circuit 80, the control circuit 60, and the failure diagnostic circuit 50. The oscillation circuit 30 oscillates the resonator 11. The output circuit 80 outputs the clock signals CK, XCK to the clock terminals TCK, TXCK, the clock signals CK, XCK being based on the oscillation clock signal from the oscillation circuit 30. To the control circuit 60, there is input the output control signal OE. The failure diagnostic circuit 50 performs the failure diagnosis for generating the failure diagnostic signal XDG.

In this way, it becomes possible to output the clock signals CK, XCK generated by oscillating the resonator 11 with the oscillation circuit 30 from the clock terminals TCK, TXCK with the output circuit 80. Further, by outputting the failure diagnostic signal XDG based on the failure diagnosis by the failure diagnostic circuit 50 via the failure diagnostic terminal TDG, it becomes possible to inform the outside of the result of the failure diagnosis of the oscillator 4.

5. Electronic Apparatus

Figure 10:
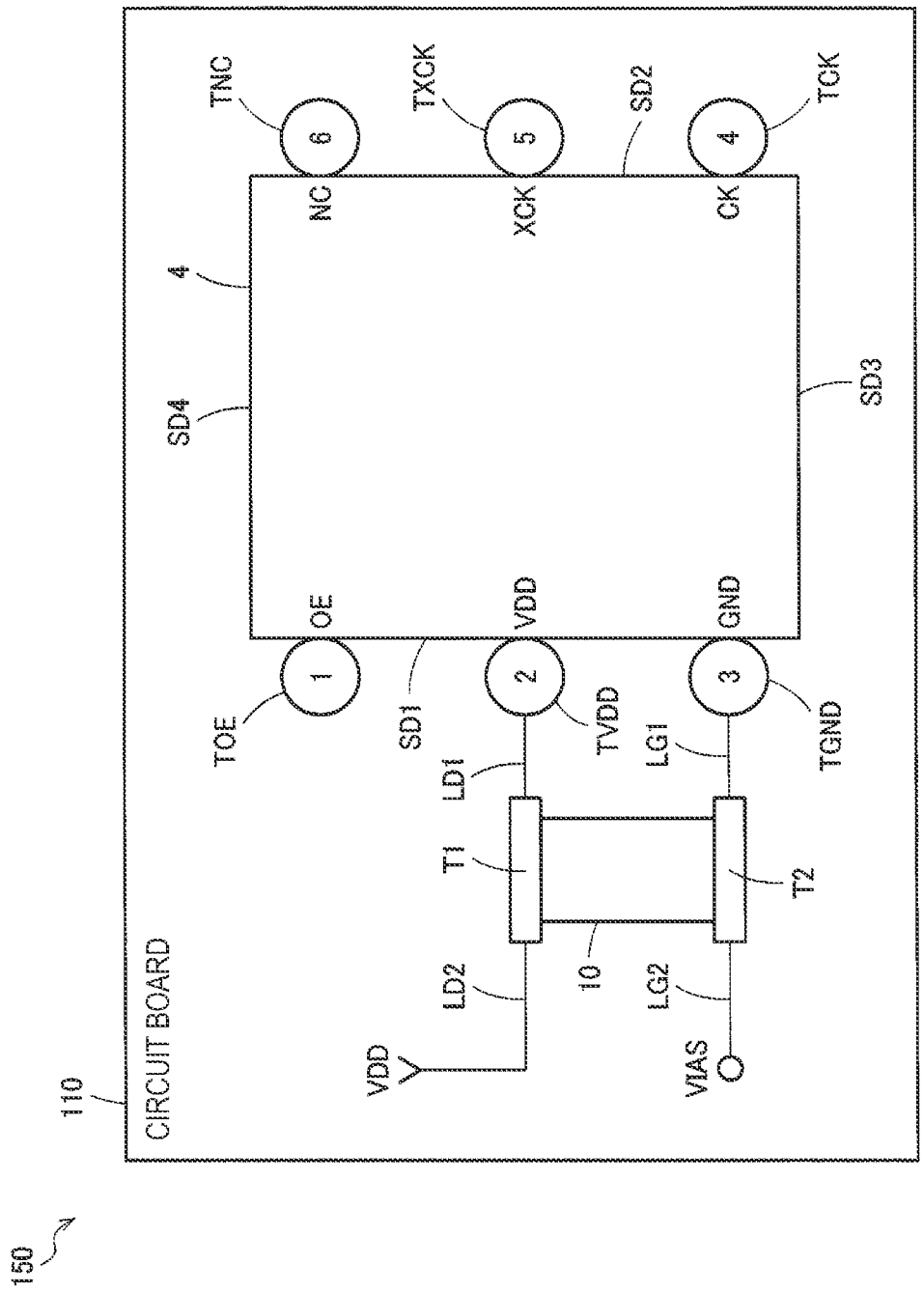
FIG. 10 is a diagram showing a first configuration example of an electronic apparatus according to the embodiment.

FIG. 10 shows a first configuration example of an electronic apparatus 150 according to the present embodiment. The electronic apparatus 150 includes the oscillator 4 according to the present embodiment described above, and a circuit board 110 on which the oscillator 4 is mounted. Further, the electronic apparatus 150 according to the present embodiment can include the capacitor 10 to be coupled to the oscillator 4.

The oscillator 4 to be installed in the electronic apparatus 150 is, for example, the oscillator 4 according to the first configuration example shown in FIG. 1. Therefore, as described with reference to FIG. 1 and so on, it is possible to realize the configuration in which no via is disposed in the middle of the interconnection for coupling the capacitor 10 from the power supply terminal TVDD and the ground terminal TGND of the oscillator 4, and thus, it becomes difficult for the effect of the capacitor 10 as the decoupling capacitor to be impaired.

Further, it is possible for the electronic apparatus 150 to include a communication device, a storage device, a display device, a sound output device, an input device, or the like not shown. The communication device is a device for performing communication with, for example, an in-car network in the case of in-car use. The storage device is realized by, for example, a memory for storing a variety of types of information. The display device is a device for displaying information such as an image, and the sound output device is a device for outputting a sound such as music or a voice. The input device is a device for the user to input a variety of types of information. For example, when the electronic apparatus 150 is an audiovisual apparatus such as an in-car use apparatus, the display device, the sound output device, the input device, or the like is disposed.

In other words, the electronic apparatus 150 according to the present embodiment includes the oscillator 4 described above, and the circuit board 110 on which the oscillator 4 is mounted.

In this way, in the electronic apparatus 150 including the oscillator 4 and the circuit board 110, when coupling the capacitor 10 to the oscillator 4, it is possible to shorten the distance from the capacitor 10 to the power supply terminal TVDD and the ground terminal TGND of the oscillator 4. Therefore, it is possible to realize the configuration in which no via is disposed in the middle of the interconnection for coupling the capacitor 10 from the power supply terminal TVDD and the ground terminal TGND of the oscillator 4. Therefore, the parasitic inductance is minimized, and it is possible to realize the electronic apparatus 150 high in signal quality.

Further, the electronic apparatus 150 according to the present embodiment includes the capacitor 10 to be mounted on the circuit board 110. The circuit board 110 includes the power supply lines LD1, LD2 and the ground lines LG1, LG2. The power supply terminal TVDD in the oscillator 4 are coupled to the power supply voltage VDD in the top layer of the circuit board 110 with the power supply lines LD1, LD2. The ground terminal TGND of the oscillator 4 is coupled to the ground voltage in the ground layer of the circuit board 110 via the ground lines LG1, LG2 and the via VIAS. Further, the first terminal T1 of the capacitor 10 is coupled to the power supply lines LD1, LD2, and the second terminal T2 is coupled to the ground lines LG1, LG2.

In this way, out of the terminals of the capacitor 10, the first terminal T1 is supplied with the power supply voltage VDD in the top layer of the circuit board 110 via the power supply line LD2, and the second terminal T2 is set at the ground potential in the ground layer of the circuit board 110 via the ground line LG2 and the via VIAS.

Figure 11:
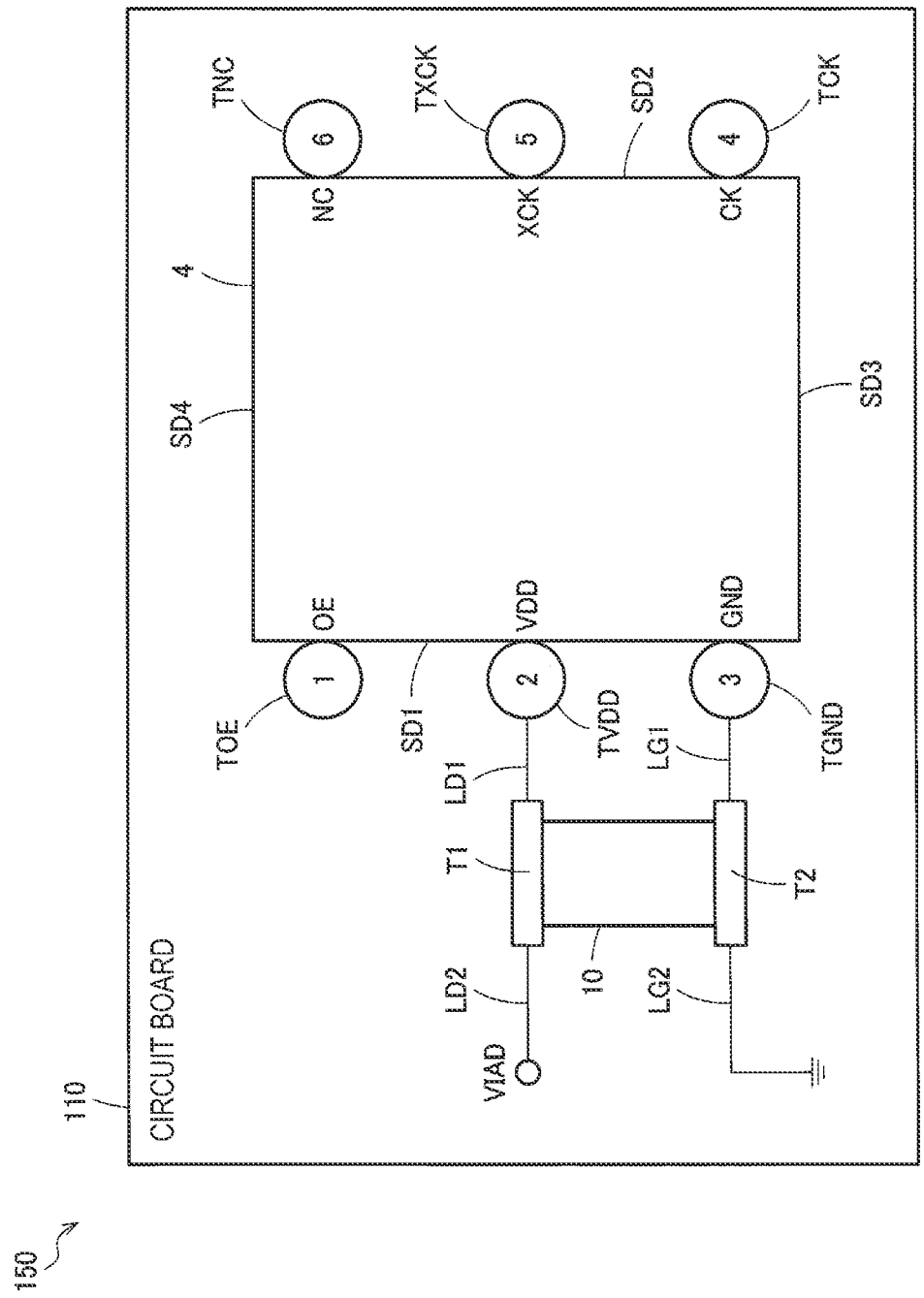
FIG. 11 is a diagram showing a second configuration example of the electronic apparatus according to the embodiment.

FIG. 11 shows a second configuration example of the electronic apparatus 150 according to the present embodiment. The second configuration example of the electronic apparatus 150 is different from the first configuration example shown in FIG. 10 in wiring to the capacitor 10. Specifically, the power supply line LD2 for supplying the power supply voltage VDD to the first terminal T1 of the capacitor 10 is coupled to the VDD layer of the circuit board 110 via the via VIAD. On the other hand, the ground line LG2 for coupling the second terminal T2 of the capacitor 10 to the ground potential is coupled to the ground potential in the top layer of the circuit board 110.

In other words, the electronic apparatus 150 according to the present embodiment includes the capacitor 10 to be mounted on the circuit board 110. The circuit board 110 includes the power supply lines LD1, LD2 and the ground lines LG1, LG2. The power supply lines LD1, LD2 are grounded to the power supply terminal TVDD of the oscillator 4 at one end, and are coupled to a via at the other end. The ground lines LG1, LG2 are coupled to the ground terminal TGND of the oscillator 4 at one end. The first terminal of the capacitor 10 is coupled at a position between the power supply terminal TVDD and the via in the power supply lines LD1, LD2, and a second terminal of the capacitor 10 is coupled to the ground lines LG1, LG2.

In this way, out of the terminals of the capacitor 10, the first terminal T1 is supplied with the power supply voltage VDD in the VDD layer of the circuit board 110 via the power supply line LD2 and the via VIAD, and the second terminal T2 is set at the ground potential in the top layer of the circuit board 110 via the ground line LG2.

Figure 12:
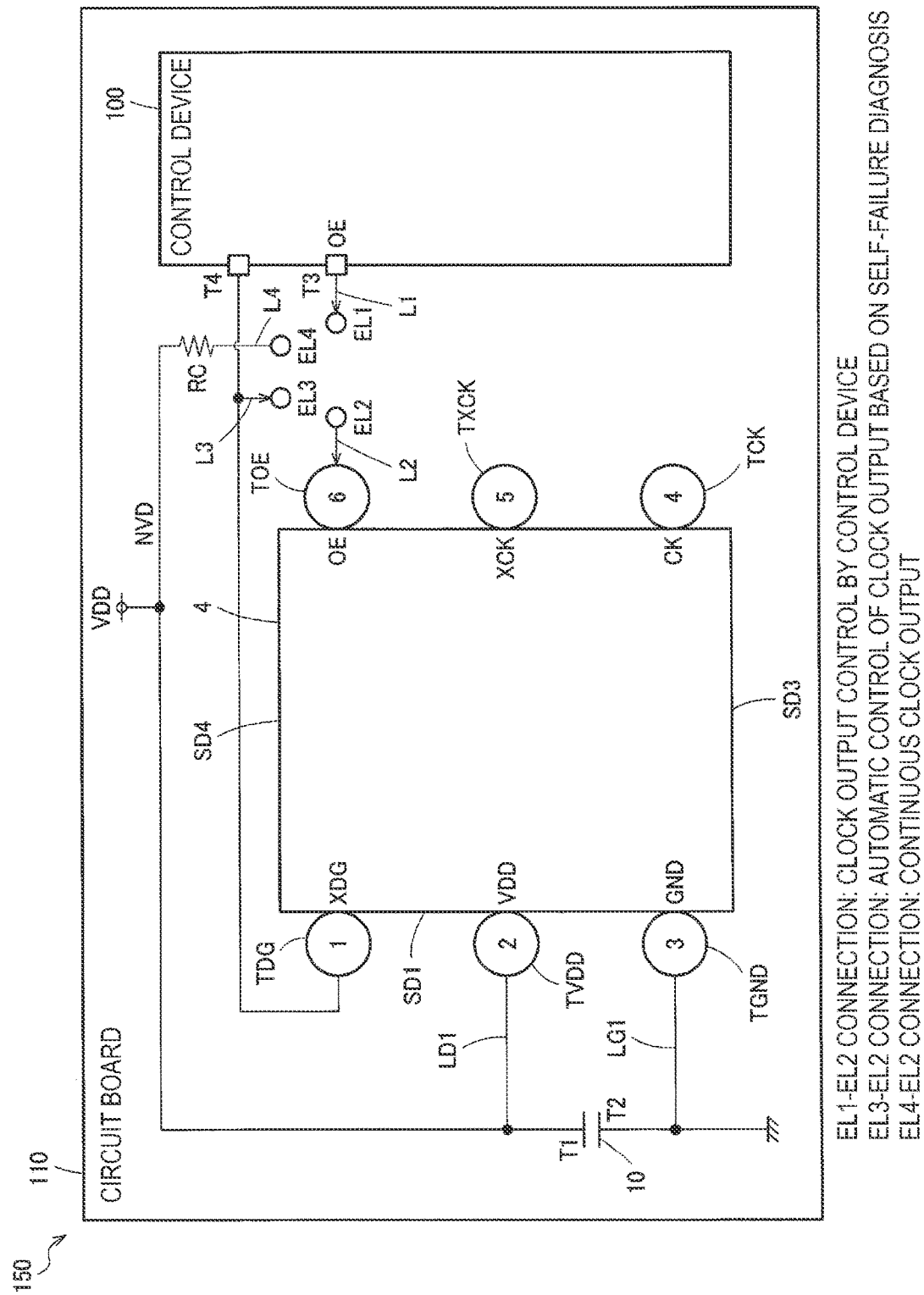
FIG. 12 is a diagram showing a third configuration example of an electronic circuit in the embodiment.

FIG. 12 shows a third configuration example of the electronic apparatus 150 according to the present embodiment. In the third configuration example, the electronic apparatus 150 includes a control device 100 to be mounted on the circuit board 110. The control device 100 is realized by a micro-controller or the like as described above. Further, as shown in FIG. 12, the control device 100 has the third terminal T3 for outputting the output control signal OE, and the fourth terminal T4 to which the failure diagnostic signal XDG is input.

Further, in the third configuration example, the circuit board 110 includes a first electrode EL1, a second electrode EL2, a third electrode EL3, and a fourth electrode EL4. Further, the first electrode EL1 is electrically coupled to the third terminal T3 of the control device 100. For example, the first electrode EL1 is coupled to the third terminal T3 of the control device 100 via a first interconnection L1 of the circuit board 110. Further, the second electrode EL2 is electrically coupled to the output control terminal TOE of the oscillator 4. For example, the second electrode EL2 is coupled to the output control terminal TOE of the oscillator 4 via a second interconnection L2 of the circuit board 110. The third electrode EL3 is electrically coupled to the failure diagnostic terminal TDG of the oscillator 4 and the fourth terminal T4 of the control device 100. For example, the third electrode EL3 is coupled to the failure diagnostic terminal TDG of the oscillator 4 and the fourth terminal T4 of the failure diagnostic circuit 50 via a third interconnection L3. It should be noted that in the third configuration example, the output control terminal TOE and the failure diagnostic terminal TDG can be exchanged for each other.

Here, electrodes such as the first electrode EL1, the second electrode EL2, and the third electrode EL3, and a fourth electrode EL4 described later are each an electrically-conductive pattern formed on the circuit board 110 in order to couple the circuit board 110 and an electronic component to each other. For example, a terminal of the electronic component is coupled to the electrode of the circuit board 110 with solder or the like. Specifically, the electrode is, for example, a land or a pad. The land is a part which is formed on the periphery of, for example, a through hole, and to which a lead part of the electronic component inserted through the hole is soldered. The pad is a part to which the electronic component of a surface-mount type is soldered.

In other words, the electronic apparatus 150 according to the present embodiment includes the circuit board 110 and the control device 100. On the circuit board 110, there is mounted the oscillator 4. The control device 100 is mounted on the circuit board 110, and has the third terminal T3 which outputs the output control signal OE, and the fourth terminal T4 to which the failure diagnostic signal XDG is input. The circuit board 110 includes the first electrode EL1, the second electrode EL2, and the third electrode EL3. The first electrode EL1 is electrically coupled to the third terminal T3 of the control device 100. The second electrode EL2 is electrically coupled to the output control terminal TOE of the oscillator 4. The third electrode EL3 is electrically coupled to the failure diagnostic terminal TDG of the oscillator 4 and the fourth terminal T4 of the control device 100.

When placing the first electrode EL1, the second electrode EL2, and the third electrode EL3 as described above, by electrically coupling the first electrode EL1 and the second electrode EL2 to each other, the output control signal OE from the control device 100 becomes to be input to the output control terminal TOE of the oscillator 4. Thus, the clock output control by the control device 100 becomes possible. For example, by the control device 100 setting the output control signal OE at the high level, the clock signals CK, XCK are output from the oscillator 4, and by the control device 100 setting the output control signal OE at the low level, the output of the clock signals CK, XCK from the oscillator 4 is stopped.

Further, by electrically coupling the third electrode EL3 and the second electrode EL2 to each other, the failure diagnostic signal XDG output by the oscillator 4 becomes to be input to the output control terminal TOE of the oscillator 4. Thus, automatic control of the clock output by the self-failure diagnosis of the oscillator 4 becomes possible. For example, when the failure diagnostic signal XDG is at the high level, by the failure diagnostic signal XDG at the high level being input to the output control terminal TOE, the oscillator 4 becomes to output the clock signals CK, XCK. On the other hand, when the failure is detected by the self-failure diagnosis of the oscillator 4, and the failure diagnostic signal XDG turns to the low level, by the failure diagnostic signal XDG at the low level being input to the output control terminal TOE, the output of the clock signals CK, XCK from the oscillator 4 becomes to stop. Thus, it becomes possible to automatically stop the clock output when a failure has been detected. The reason that the automatic control of the clock output by such self-failure diagnosis of the oscillator 4 becomes possible is that the first-logic output control signal as one of a positive-logic signal and a negative-logic signal is input to the output control terminal TOE, and the failure diagnostic terminal TDG outputs the second-logic failure diagnostic signal XDG as the other of a positive-logic signal and a negative-logic signal.

Further, in the third configuration example of the electronic apparatus 150, the failure diagnostic terminal TDG of the oscillator 4 and the fourth terminal T4 of the control device 100 are coupled to each other via the third interconnection L3. Therefore, when the oscillator 4 has detected the failure, and the failure diagnostic signal XDG has turned to the low level, it becomes possible for the control device 100 to recognize that the failure has occurred in the oscillator 4 by detecting the failure diagnostic signal XDG at the low level.

Figure 13:
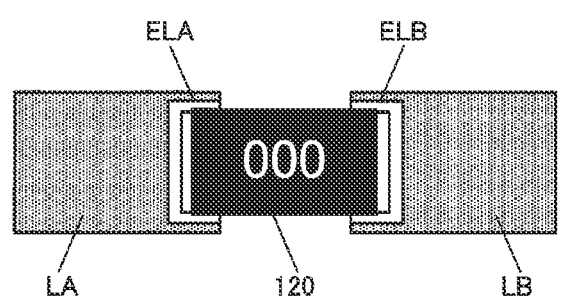
FIG. 13 is an explanatory diagram of a coupling element of an electrode.

Regarding the coupling of the first electrode EL1, the second electrode EL2, and the third electrode EL3, and the fourth electrode EL4 described later, it is possible to use a coupling element 120 such as a zero-ohm resistor element shown in FIG. 13. Due to the coupling element 120, it is possible to couple an electrode ELA disposed on an interconnection LA and an electrode ELB disposed on an interconnection LB to each other as shown in FIG. 13. By using such a coupling element 120, it becomes possible to couple the first electrode EL1 and the second electrode EL2 to each other at low impedance, or couple the third electrode EL3 and the second electrode EL2 to each other at low impedance. Further, for example, it becomes possible to couple the first electrode EL1 and the second electrode EL2 to each other with the coupling element 120 such as a zero-ohm resistor element in the circuit board 110 used in a first product, and to couple the third electrode EL3 and the second electrode EL2 to each other with the coupling element 120 such as a zero-ohm resistor element in the circuit board 110 used in a second product. Thus, it becomes possible to use the same circuit board 110 in all of a variety of products, and it becomes possible to provide a variety of products at low cost. It should be noted that the coupling element 120 is not limited to the zero-ohm resistor element, and can also be a switching element which is mechanically or electrically put on or put off.

In other words, in the electronic apparatus 150 according to the present embodiment, the first electrode EL1 and the second electrode EL2, or the third electrode EL3 and the second electrode EL2, are coupled to each other with the coupling element 120 as illustrated in, for example, FIG. 10.

In this way, by coupling the first electrode EL1 and the second electrode EL2 to each other with the coupling element 120, the clock output control by the output control signal OE from the control device 100 becomes possible, and the control of outputting, and stopping the output of, the clock signals CK, XCK using the output control signal OE becomes possible. Further, by coupling the third electrode EL3 and the second electrode EL2 to each other with the coupling element 120, the automatic control of the clock output by the self-failure diagnosis of the oscillator 4 becomes possible, and it becomes possible to automatically stop the output of the clock signals CK, XCK by the failure diagnostic signal XDG when the failure has been detected.

Further, as shown in FIG. 12, the fourth electrode EL4 is electrically coupled to the power supply terminal TVDD of the oscillator 4 and the first terminal T1 of the capacitor 10. Then, the fourth electrode EL4 is electrically coupled to the other end of a resistor RC one end of which is electrically coupled to a power supply node NVD, via the fourth interconnection L4. The electrode of the fourth electrode EL4 is also an electrically-conductive pattern formed on the circuit board 110 in order to couple the circuit board 110 and the electronic component to each other, and is, for example, a land or a pad.

In other words, in the electronic apparatus 150 according to the present embodiment, the circuit board 110 includes the fourth electrode EL4 electrically coupled to the other end of the resistor RC one end of which is electrically coupled to the power supply node NVD.

When placing such a fourth electrode EL4, by electrically coupling the second electrode EL2 and the fourth electrode EL4 to each other, it becomes possible to always set the output control terminal TOE at the high level due to pulling up with the resistor RC the one end of which is coupled to the power supply node NVD at the power supply voltage VDD, and thus, continuous clock output becomes possible. In other words, the clock signals CK, XCK become to continuously be output from the oscillator 4.

Further, in the electronic apparatus 150 according to the present embodiment, the first electrode EL1 and the second electrode EL2, the third electrode EL3 and the second electrode EL2, or the fourth electrode EL4 and the second electrode EL2, are coupled to each other with the coupling element 120.

In this way, by coupling the first electrode EL1 and the second electrode EL2 to each other with the coupling element 120, the clock output control by the output control signal OE from the failure diagnostic circuit 50 becomes possible. Further, by coupling the third electrode EL3 and the second electrode EL2 to each other with the coupling element 120, the automatic control of the clock output by the self-failure diagnosis of the oscillator 4 becomes possible. Further, by coupling the fourth electrode EL4 and the second electrode EL2 to each other with the coupling element 120, the continuous output of the clock signals CK, XCK becomes possible. Thus, it becomes possible to use the same circuit board 110 in all of a variety of products, and it becomes possible to provide a variety of products at low cost.

6. Structural Example of Oscillator

FIG. 14 shows a first structural example of the oscillator 4 according to the present embodiment. The oscillator 4 has the resonator 11, the circuit device 20, and a package 15 for housing the resonator 11 and the circuit device 20. The package 15 is formed of, for example, ceramics, and has a housing space inside, and the resonator 11 and the circuit device 20 are housed in the housing space. The housing space is airtightly sealed, and is set to a reduced-pressure state, desirably a state approximate to a vacuum state. Due to the package 15, it is possible to protect the resonator 11 and the circuit device 20 from an impact, dust, heat, moisture, and so on in good condition.

The package 15 has a base 16 and a lid 17. Specifically, the package 15 is constituted by the base 16 for supporting the resonator 11 and the circuit device 20, and the lid 17 bonded to an upper surface of the base 16 so that the housing space is formed between the base 16 and the lid 17. Further, the resonator 11 is supported by a step part disposed inside the base 16 via terminal electrodes. Further, the circuit device 20 is disposed on an inner bottom surface of the base 16. Specifically, the circuit device 20 is disposed so that an active surface faces to the inner bottom surface of the base 16. The active surface is a surface on which the circuit elements of the circuit device 20 are formed. Further, bumps BMP are provided to the terminals of the circuit device 20. Further, the circuit device 20 is supported by the inner bottom surface of the base 16 via the bumps BMP having electrical conductivity. The bumps BMP having electrical conductivity are, for example, metal bumps, and the resonator 11 and the circuit device 20 are electrically coupled to each other via the bumps BMP, internal interconnections and the terminal electrodes of the package 15, and so on. Further, the circuit device 20 is electrically coupled to external terminals 18, 19 of the oscillator 4 via the bumps BMP and the internal interconnections of the package 15. The external terminals 18, 19 are formed on an outer bottom surface of the package 15. The external terminals 18, 19 are coupled to an external device via external wiring. The external wiring is, for example, interconnections provided to the circuit board on which the external device is mounted. Thus, it becomes possible to output the clock signal and so on to the external device.

These external terminals 18, 19 correspond to the output control terminal TOE, the failure diagnostic terminal TDG, the ground terminal TGND, the clock terminals TCK, TXCK, and the power supply terminal TVDD described with reference to FIG. 1, FIG. 5, and so on. For example, the output control terminal TOE, the failure diagnostic terminal TDG, the ground terminal TGND are arranged side by side along the first side of the outer bottom surface of the package 15 of the oscillator 4, and the power supply terminal TVDD and the clock terminals TXCK, TCK are arranged side by side along the second side as the opposite side to the first side of the outer bottom surface.

It should be noted that although in FIG. 14, the circuit device 20 is flip-mounted so that the active surface of the circuit device 20 faces downward, the present embodiment is not limited to such a mounting arrangement. It is possible to mount the circuit device 20 so that, for example, the active surface of the circuit device 20 faces upward. In other words, the circuit device 20 is mounted so that the active surface is opposed to the resonator 11.

FIG. 15 shows a second structural example of the oscillator 4. The oscillator 4 has the resonator 11, the circuit device 20, and the package 15 for housing the resonator 11 and the circuit device 20, and the package 15 has the base 16 and the lid 17. The base 16 has a first substrate 6 as an intermediate substrate, a second substrate 7 which is stacked at the upper surface side of the first substrate 6, and which has a substantially rectangular frame shape, and a third substrate 8 which is stacked at the bottom surface side of the first substrate 6, and which has a substantially rectangular frame shape. Further, the lid 17 is bonded to an upper surface of the second substrate 7, and the resonator 11 is housed in a housing space S1 formed of the first substrate 6, the second substrate 7, and the lid 17. For example, the resonator 11 is airtightly sealed in the housing space S1, and the housing space S1 is set to a reduced-pressure state, desirably a state approximate to a vacuum state. Thus, it is possible to protect the resonator 11 from an impact, dust, heat, moisture and so on in good condition. Further, in a housing space S2 formed of the first substrate and the third substrate 8, there is housed the circuit device 20 as a semiconductor chip. Further, on the bottom surface of the third substrate 8, there are formed the external terminals 18, 19 as electrode terminals for external coupling of the oscillator 4.

Further, in the housing space S1, the resonator 11 is coupled to a first electrode terminal and a second electrode terminal formed on the upper surface of the first substrate 6 with coupling parts CDC1, CDC2 having electrical conductivity. The coupling parts CDC1, CDC2 having electrical conductivity can be realized by bumps having electrical conductivity such as metal bumps, or can also be realized by an electrically-conductive adhesive. Specifically, the first electrode pad not shown formed at one end of the resonator 11 of, for example, a tuning-fork type is coupled to the first electrode terminal formed on the upper surface of the first substrate 6 via an electrically-conductive coupling part CDC1. Further, the first electrode terminal is electrically coupled to the pad PX1 of the circuit device 20. Further, the second electrode pad not shown formed at the other end of the resonator 11 of the tuning-fork type is coupled to the second electrode terminal formed on the upper surface of the first substrate 6 via an electrically-conductive coupling part CDC2. Further, the second electrode terminal is electrically coupled to the pad PX2 of the circuit device 20. Thus, it becomes possible to electrically couple one end and the other end of the resonator 11 to the pads PX1, PX2 of the circuit device 20 via the electrically-conductive coupling parts CDC1, CDC2. Further, bumps BMP having electrical conductivity are formed on the plurality of pads of the circuit device 20 as the semiconductor chip, and these bumps BMP having electrical conductivity are coupled to the plurality of electrode terminals formed on the bottom surface of the first substrate 6. Further, the electrode terminals coupled to the pads of the circuit device 20 are electrically coupled to the external terminals 18, 19 of the oscillator 4 via the internal interconnections and so on.

These external terminals 18, 19 correspond to the output control terminal TOE, the failure diagnostic terminal TDG, the ground terminal TGND, the clock terminals TCK, TXCK, and the power supply terminal TVDD described with reference to FIG. 1, FIG. 5, and so on.

It should be noted that the oscillator 4 can be an oscillator in a wafer-level package (WLP). In this case, the oscillator 4 includes a base having a semiconductor substrate, and through electrodes penetrating the semiconductor substrate between a first surface and a second surface thereof, the resonator 11 fixed to the first surface of the semiconductor substrate via an electrically conductive bonding members such as metal bumps, and external terminals disposed at the second surface side of the semiconductor substrate via an insulating layer such as a relocation wiring layer. Further, an integrated circuit forming the circuit device 20 is formed on the first surface or the second surface of the semiconductor substrate. In this case, a first semiconductor wafer provided with a plurality of bases on which the resonators 11 and the integrated circuits are disposed, and a second semiconductor wafer provided with a plurality of lids are bonded to each other to thereby bond the plurality of bases and the plurality of lids to each other, and then, separating of the oscillators 4 is performed using a dicing saw or the like. In this way, it becomes possible to realize the oscillator 4 in the wafer-level package, and thus, it becomes possible to manufacture the oscillator 4 with high throughput and at low cost.

As described above, the oscillator according to the present embodiment includes the power supply terminal, the ground terminal, the positive-side clock terminal, and the negative-side clock terminal. The power supply terminal is supplied with the high potential-side power supply voltage. The ground terminal is supplied with the low potential-side power supply voltage. The positive-side clock terminal outputs the positive-side clock signal of the differential clock signal. The negative-side clock terminal outputs the negative-side clock signal of the differential clock signal. The power supply terminal and the ground terminal are arranged side by side, and the positive-side clock terminal and the negative-side clock terminal are arranged side by side.

According to the present embodiment, since the power supply terminal and the ground terminal are arranged side by side, it is possible to arrange the power supply terminal and the ground terminal side by side on arbitrary one side of the oscillator. Further, since the positive-side clock terminal and the negative-side clock terminal are arranged side by side, it is possible to arrange the positive-side clock terminal and the negative-side clock terminal side by side on arbitrary one side of the oscillator.

Further, in the oscillator according to the present embodiment, the power supply terminal and the ground terminal are arranged side by side along the first side of the oscillator, and the negative-side clock terminal and the positive-side clock terminal are arranged side by side along the second side as the opposite side to the first side.

In this way, the power supply terminal and the ground terminal are disposed side by side on the first side of the oscillator, and the negative-side clock terminal and the positive-side clock terminal are disposed side by side on the second side as the opposite side to the first side. Therefore, it is possible to prevent the power supply terminal and the ground terminal from being disposed separately on the two sides as the opposite sides of the oscillator. Further, it is also possible to prevent the negative-side clock terminal and the positive-side clock terminal from being disposed separately on the two sides as the opposite sides of the oscillator.

Further, the oscillator according to the present embodiment includes the output control terminal to which the output control signal for the clock signals is input, and the output control terminal, the power supply terminal, and the ground terminal are arranged side by side along the first side.

In this way, it is possible to prevent the output control terminal, the power supply terminal, and the ground terminal from being disposed separately on the two sides as the opposite sides of the oscillator.

Further, the oscillator according to the present embodiment includes the failure diagnostic terminal for outputting the failure diagnostic signal, and the failure diagnostic terminal, the negative-side clock terminal, and the positive-side clock terminal are arranged along the second side.

In this way, it is possible to prevent the failure diagnostic terminal, the negative-side clock terminal, and the positive-side clock terminal from being disposed separately on the two sides as the opposite sides of the oscillator.

Further, the oscillator according to the present embodiment includes the output control terminal to which the output control signal for the clock signals is input, and the output control terminal, the negative-side clock terminal, and the positive-side clock terminal are arranged side by side along the second side.

In this way, it is possible to prevent the output control terminal, the negative-side clock terminal, and the positive-side clock terminal from being disposed separately on the two sides as the opposite sides of the oscillator.

Further, the oscillator according to the present embodiment includes the failure diagnostic terminal for outputting the failure diagnostic signal, and the failure diagnostic terminal, the power supply terminal, and the ground terminal are arranged side by side along the first side.

In this way, it is possible to prevent the failure diagnostic terminal, the power supply terminal, and the ground terminal from being disposed separately on the two sides as the opposite sides of the oscillator.

Further, in the oscillator according to the present embodiment, when defining a side opposed to the first side of the oscillator as a second side, a side crossing the first side and the second side as a third side, and a side opposed to the third side as a fourth side, the power supply terminal is arranged on a first corner where the first side and the fourth side cross each other. Further, the ground terminal is arranged on a second corner where the second side and the fourth side cross each other.

In this way, it is possible to arrange the power supply terminal and the ground terminal at both ends of the fourth side, and it is possible to arrange the power supply terminal and the ground terminal around the fourth side in a lump.

The oscillator according to the present embodiment includes the output control terminal to which the output control signal for the clock signals is input, and the failure diagnostic terminal for outputting the failure diagnostic signal. To the output control terminal, there is input the first-logic output control signal as one of a positive-logic signal and a negative-logic signal, and the failure diagnostic terminal outputs the second-logic failure diagnostic signal as the other of a positive-logic signal and a negative-logic signal.

In this way, since the failure diagnostic signal becomes a negative-logic signal when the output control signal is a positive-logic signal, and the failure diagnostic signal becomes a positive-logic signal when the output control signal is a negative-logic signal, it becomes possible to prevent the situation in which the clock signals stop even when a short-circuit failure occurs between the interconnection of the output control signal and the interconnection of the failure diagnostic signal. Therefore, it becomes possible to realize the failure diagnosis of the oscillator, and at the same time, it becomes possible to prevent the problem such as stoppage of clock output caused by the short-circuit failure or the like from occurring.

Further, the oscillator according to the present embodiment includes the resonator and the circuit device. The circuit device includes the oscillation circuit, the output circuit, the control circuit, and the failure diagnostic circuit. The oscillation circuit oscillates the resonator. The output circuit outputs the clock signals to the clock terminals, the clock signals being based on the oscillation clock signal from the oscillation circuit. To the control circuit, there is input the output control signal. The failure diagnostic circuit performs the failure diagnosis for generating the failure diagnostic signal.

In this way, it becomes possible to output the clock signals generated by oscillating the resonator with the oscillation circuit from the clock terminals with the output circuit. Further, by outputting the failure diagnostic signal based on the failure diagnosis by the failure diagnostic circuit via the failure diagnostic terminal, it becomes possible to inform the outside of the result of the failure diagnosis of the oscillator.

The electronic apparatus according to the present embodiment includes the oscillator described above, and the circuit board on which the oscillator is mounted.

In this way, in the electronic apparatus including the oscillator and the circuit board, when coupling the capacitor to the oscillator, it is possible to shorten the distance from the capacitor to the power supply terminal and the ground terminal of the oscillator. Therefore, it is possible to realize the configuration in which no via is disposed in the middle of the interconnection for coupling the capacitor from the power supply terminal or the ground terminal of the oscillator. Therefore, the parasitic inductance is minimized, and it is possible to realize the electronic apparatus high in signal quality.

Further, the electronic apparatus according to the present embodiment includes the capacitor to be mounted on the circuit board. The circuit board includes the power supply line and the ground line. The power supply line is coupled to the power supply terminal of the oscillator at one end. The ground line is coupled to the ground terminal of the oscillator at one end, and is coupled to the via at the other end. The first terminal of the capacitor is coupled to the power supply line, and the second terminal of the capacitor is coupled to a position between the ground terminal and the via in the ground line.

In this way, out of the terminals of the capacitor, the first terminal is supplied with the power supply voltage in the top layer of the circuit board via the power supply line, and the second terminal is set at the ground potential in the ground layer of the circuit board via the ground line and the via.

Further, the electronic apparatus according to the present embodiment includes the capacitor to be mounted on the circuit board. The circuit board includes the power supply line and the ground line. The power supply line is coupled to the power supply terminal of the oscillator at one end, and is coupled to the via at the other end. The ground line is coupled to the ground terminal of the oscillator at one end. The first terminal of the capacitor is coupled to a position between the power supply terminal and the via in the power supply line, and the second terminal of the capacitor is coupled to the ground line.

In this way, out of the terminals of the capacitor, the first terminal is supplied with the power supply voltage in the VDD layer of the circuit board via the power supply line and the via, and the second terminal is set at the ground potential in the top layer of the circuit board via the ground line.

Further, the electronic apparatus according to the present embodiment includes the circuit board and the control device. On the circuit board, there is mounted the oscillator. The control device is mounted on the circuit board, and has the third terminal for outputting the output control signal, and the fourth terminal to which the failure diagnostic signal is input. The circuit board includes the first electrode, the second electrode, and the third electrode. The first electrode is electrically coupled to the third terminal of the control device. The second electrode is electrically coupled to the output control terminal of the oscillator. The third electrode is electrically coupled to the failure diagnostic terminal of the oscillator and the fourth terminal of the control device.

When placing the first electrode, the second electrode, the third electrode, and the fourth electrode as described above, by electrically coupling the first electrode and the second electrode to each other, the output control signal from the control device becomes to be input to the output control terminal of the oscillator. Thus, the clock output control by the control device becomes possible. For example, by the control device setting the output control signal at the high level, the clock signals are output from the oscillator, and by the control device setting the output control signal at the low level, the output of the clock signals from the oscillator stops.

Further, in the electronic apparatus according to the present embodiment, the first electrode and the second electrode, or the third electrode and the second electrode, are coupled to each other with the coupling element.

In this way, by coupling the first electrode and the second electrode to each other with the coupling element, the clock output control by the output control signal from the control device becomes possible, and the control of outputting, and stopping the output of, the clock signals using the output control signal becomes possible. Further, by coupling the third electrode and the second electrode to each other with the coupling element, the automatic control of the clock output by the self-failure diagnosis of the oscillator becomes possible, and it becomes possible to automatically stop the output of the clock signals by the failure diagnostic signal when the failure has been detected.

Further, in the electronic apparatus according to the present embodiment, the circuit board includes the fourth electrode electrically coupled to the other end of the resistor one end of which is electrically coupled to the power supply node.

When placing such a fourth electrode, by electrically coupling the second electrode and the fourth electrode to each other, it becomes possible to always set the output control terminal at the high level due to pulling up with the resistor the one end of which is coupled to the power supply node at the power supply voltage, and thus, continuous clock output becomes possible. In other words, the clock signals become to continuously be output from the oscillator.

Further, in the electronic apparatus according to the present embodiment, the first electrode and the second electrode, the third electrode and the second electrode, or the fourth electrode and the second electrode, are coupled to each other with the coupling element.

In this way, by coupling the first electrode and the second electrode to each other with the coupling element, the clock output control by the output control signal from the control device becomes possible. Further, by coupling the third electrode and the second electrode to each other with the coupling element, the automatic control of the clock output by the self-failure diagnosis of the oscillator becomes possible. Further, by coupling the fourth electrode and the second electrode to each other with the coupling element, the continuous output of the clock signals becomes possible. Thus, it becomes possible to use the same circuit board in all of a variety of products, and it becomes possible to provide a variety of products at low cost.

It should be noted that although the present embodiment is hereinabove described in detail, it should easily be understood by those skilled in the art that it is possible to make a variety of modifications not substantially departing from the novel matters and the advantages of the present disclosure. Therefore, all of such modified examples should be included in the scope of the present disclosure. For example, a term described at least once with a different term having a broader sense or the same meaning in the specification or the accompanying drawings can be replaced with that different term in any part of the specification or the accompanying drawings. Further, all of the combinations of the present embodiment and the modified examples are also included in the scope of the present disclosure. Further, the configurations and the operations of the oscillator and the electronic apparatus are not limited to those described in the present embodiment, but can be implemented with a variety of modifications.

What is claimed is:

1. An oscillator comprising:
    a power supply terminal supplied with a high potential-side power supply voltage;
    a ground terminal supplied with a low potential-side power supply voltage;
    a positive-side clock terminal configured to output a positive-side clock signal of a differential clock signal; and
    a negative-side clock terminal configured to output a negative-side clock signal of the differential clock signal, wherein
    the power supply terminal and the ground terminal are arranged side by side,
    the positive-side clock terminal and the negative-side clock terminal are arranged side by side, and
    the ground terminal is located closer to the power supply terminal than each of the positive-side clock terminal and the negative-side clock terminal.

2. The oscillator according to claim 1, wherein
the power supply terminal and the ground terminal are arranged side by side along a first side of the oscillator, and
the negative-side clock terminal and the positive-side clock terminal are arranged side by side along a second side as an opposite side to the first side.

3. The oscillator according to claim 2, further comprising:
an output control terminal to which an output control signal for the clock signals is input, wherein
the output control terminal, the power supply terminal, and the ground terminal are arranged side by side along the first side.

4. The oscillator according to claim 3, further comprising:
a failure diagnostic terminal configured to output a failure diagnostic signal, wherein
the failure diagnostic terminal, the negative-side clock terminal, and the positive-side clock terminal are arranged along the second side.

5. The oscillator according to claim 2, further comprising:
an output control terminal to which an output control signal for the clock signals is input, wherein
the output control terminal, the negative-side clock terminal, and the positive-side clock terminal are arranged side by side along the second side.

6. The oscillator according to claim 5, further comprising:
a failure diagnostic terminal configured to output a failure diagnostic signal, wherein
the failure diagnostic terminal, the power supply terminal, and the ground terminal are arranged side by side along the first side.

7. The oscillator according to claim 1, further comprising:
an output control terminal to which an output control signal for the clock signals is input; and
a failure diagnostic terminal configured to output a failure diagnostic signal, wherein
the output control signal which is a first-logic signal as one of a positive-logic signal and a negative-logic signal is input to the output control terminal, and
the failure diagnostic terminal is configured to output the failure diagnostic signal which is a second-logic signal as another of the positive-logic signal and the negative-logic signal.

8. The oscillator according to claim 4, further comprising:
a resonator; and
a circuit device, wherein
the circuit device includes
an oscillation circuit configured to oscillate the resonator,
an output circuit configured to output a clock signal to a clock terminal, the clock signal being based on an oscillation clock signal from the oscillation circuit,
a control circuit to which the output control signal is input, and
a failure diagnostic circuit configured to perform a failure diagnosis for generating the failure diagnostic signal.

9. An electronic apparatus comprising:
the oscillator according to claim 1; and
a circuit board on which the oscillator is mounted.

10. The electronic apparatus according to claim 9, further comprising:
a capacitor to be mounted on the circuit board, wherein the circuit board includes
a power supply line coupled to the power supply terminal of the oscillator at one end, and
a ground line coupled to the ground terminal of the oscillator at one end, and coupled to a via at another end,
a first terminal of the capacitor is coupled to the power supply line, and
a second terminal of the capacitor is coupled at a position between the ground terminal and the via in the ground line.

11. The electronic apparatus according to claim 9, further comprising:
a capacitor to be mounted on the circuit board, wherein the circuit board includes
a power supply line coupled to the power supply terminal of the oscillator at one end, and coupled to a via at another end, and
a ground line coupled to the ground terminal of the oscillator at one end,
a first terminal of the capacitor is coupled at a position between the power supply terminal and the via in the power supply line, and
a second terminal of the capacitor is coupled to the ground line.

12. An electronic apparatus comprising:
the oscillator according to claim 7;
a circuit board on which the oscillator is mounted; and
a control device which is mounted on the circuit board, and which has a first terminal configured to output the output control signal, and a second terminal to which the failure diagnostic signal is input, wherein
the circuit board includes
a first electrode electrically coupled to the first terminal of the control device,
a second electrode electrically coupled to the output control terminal of the oscillator, and
a third electrode electrically coupled to the failure diagnostic terminal of the oscillator and the second terminal of the control device.

13. The electronic apparatus according to claim 12, wherein
the first electrode and the second electrode, or the third electrode and the second electrode, are coupled to each other with a coupling element.

14. The electronic apparatus according to claim 12, wherein
the circuit board includes a fourth electrode electrically coupled to one end of a resistor another end of which is electrically coupled to a power supply node.

15. The electronic apparatus according to claim 14, wherein
the first electrode and the second electrode, the third electrode and the second electrode, or the fourth electrode and the second electrode, are coupled to each other with a coupling element.

* * * * *